(12) United States Patent
Genova et al.

(10) Patent No.: US 11,742,764 B2
(45) Date of Patent: Aug. 29, 2023

(54) RESONANT POWER CONVERTERS INCLUDING COUPLED INDUCTORS

(71) Applicant: Maxim Integrated Products, Inc., San Jose, CA (US)

(72) Inventors: Angelo Genova, Mascalucia (IT); Laszlo Lipcsei, Campbell, CA (US); Alexandr Ikriannikov, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 17/648,052

(22) Filed: Jan. 14, 2022

(65) Prior Publication Data

US 2022/0247321 A1 Aug. 4, 2022

Related U.S. Application Data

(60) Provisional application No. 63/145,892, filed on Feb. 4, 2021.

(51) Int. Cl.
| | | |
|---|---|---|
| *H02M 3/335* | (2006.01) | |
| *H02M 3/00* | (2006.01) | |
| *H02M 1/36* | (2007.01) | |
| *H02M 1/00* | (2006.01) | |
| *H02M 3/07* | (2006.01) | |
| *H02M 3/158* | (2006.01) | |
| *H02M 1/44* | (2007.01) | |

(52) U.S. Cl.
CPC ..... *H02M 3/33569* (2013.01); *H02M 1/0043* (2021.05); *H02M 1/0054* (2021.05); *H02M 1/0064* (2021.05); *H02M 1/36* (2013.01); *H02M 3/01* (2021.05); *H02M 3/072* (2021.05); *H02M 3/1586* (2021.05); *H02M 3/33576* (2013.01); *H02M 1/44* (2013.01)

(58) Field of Classification Search
CPC .......... H02M 3/33569; H02M 1/0043; H02M 1/0054; H02M 1/0064; H02M 1/36; H02M 3/01; H02M 3/072; H02M 3/1586; H02M 3/33576; H02M 1/44; H02M 1/007; H02M 1/0095; H02M 1/42
See application file for complete search history.

(56) References Cited

U.S. PATENT DOCUMENTS

| | | | |
|---|---|---|---|
| 6,362,986 | B1 | 3/2002 | Schultz et al. |
| 9,917,517 | B1 * | 3/2018 | Jiang ....................... H02M 1/34 |
| 10,122,256 | B1 * | 11/2018 | Babazadeh ........... H02M 1/083 |

(Continued)

OTHER PUBLICATIONS

Shuai Jiang et al., Switched Tank Converters, Jun. 2019, 15 pages.

*Primary Examiner* — Yusef A Ahmed
(74) *Attorney, Agent, or Firm* — PdZ Patent Law, PLLC

(57) ABSTRACT

A resonant power converter includes a capacitive divider circuit, a coupled inductor, and N switching stages, where N is an integer greater than two. The coupled inductor includes N windings, and total leakage inductance of the coupled inductor and equivalent capacitance of the capacitive divider circuit collectively form a resonant tank circuit of the resonant power converter. Each switching stage is electrically coupled between a respective one of the N windings of the coupled inductor and the capacitive divider circuit. The capacitive divider circuit may include one or more resonant capacitors.

8 Claims, 24 Drawing Sheets

(56) References Cited

U.S. PATENT DOCUMENTS

| | | | |
|---|---|---|---|
| 10,608,530 B1* | 3/2020 | Zhu | H02M 3/07 |
| 10,651,731 B1* | 5/2020 | Rainer | H02M 3/1588 |
| 10,778,098 B2* | 9/2020 | Yang | H02M 3/07 |
| 10,804,798 B1* | 10/2020 | Rizzolatti | H02M 3/33573 |
| 10,938,310 B1* | 3/2021 | Cheng | H02M 3/33515 |
| 10,972,010 B2* | 4/2021 | Cheng | H02M 3/07 |
| 11,011,991 B1* | 5/2021 | Mercer | H02M 1/15 |
| 11,362,576 B1* | 6/2022 | Rizzolatti | H02M 3/07 |
| 11,621,633 B2* | 4/2023 | Zhu | H02M 3/07 363/13 |
| 2005/0030778 A1 | 2/2005 | Phadke et al. | |
| 2008/0239772 A1* | 10/2008 | Oraw | H02M 7/4837 363/60 |
| 2010/0328968 A1* | 12/2010 | Adragna | H02M 3/33571 363/21.02 |
| 2014/0062446 A1* | 3/2014 | Ikriannikov | H02M 1/14 336/200 |
| 2015/0222193 A1* | 8/2015 | Zambetti | H02M 1/08 363/21.02 |
| 2015/0303802 A1* | 10/2015 | Childs | H02M 3/158 323/271 |
| 2016/0352218 A1* | 12/2016 | Stauth | H02M 3/07 |
| 2018/0205314 A1* | 7/2018 | Bleus | H03K 17/133 |
| 2019/0245435 A1* | 8/2019 | Botti | H03F 3/2171 |
| 2019/0334434 A1* | 10/2019 | Jong | H02M 3/158 |
| 2019/0363644 A1* | 11/2019 | Li | H02M 7/4837 |
| 2020/0185947 A1* | 6/2020 | Tkachenko | H02J 7/0071 |
| 2020/0186028 A1* | 6/2020 | Cheng | H02M 3/07 |
| 2020/0220461 A1* | 7/2020 | Pastorina | H02M 3/07 |
| 2020/0220468 A1* | 7/2020 | Rainer | H02M 3/33523 |
| 2020/0321868 A1* | 10/2020 | Michal | H02M 3/07 |
| 2020/0358355 A1* | 11/2020 | Zambetti | H03K 17/693 |
| 2021/0218342 A1* | 7/2021 | Zmood | H02M 7/49 |
| 2021/0288576 A1* | 9/2021 | Rizzolatti | H02M 3/158 |
| 2021/0288581 A1* | 9/2021 | Zhu | H02M 1/0048 |
| 2021/0391801 A1* | 12/2021 | Colonna | H02M 3/33576 |
| 2022/0103066 A1* | 3/2022 | Chen | H02M 3/07 |
| 2022/0190738 A1* | 6/2022 | Chen | H02M 1/4233 |
| 2022/0209684 A1* | 6/2022 | Jin | H02M 3/1584 |
| 2022/0263410 A1* | 8/2022 | Saggini | H02M 3/155 |
| 2022/0345042 A1* | 10/2022 | Ruggeri | H02M 1/0095 |
| 2022/0352816 A1* | 11/2022 | Liu | H02M 3/07 |
| 2022/0368214 A1* | 11/2022 | Ikriannikov | H02M 3/1584 |
| 2023/0091489 A1* | 3/2023 | Cannillo | H02M 3/1582 |

\* cited by examiner

RESONANT POWER CONVERTERS INCLUDING COUPLED INDUCTORS

RELATED APPLICATIONS

This application claims benefit of priority to U.S. Provisional Patent Application Ser. No. 63/145,892, filed on Feb. 4, 2021, which is incorporated herein by reference.

BACKGROUND

A hard-switching power converter includes one or more switching devices that switch between their on-states and off-states while carrying significant current. Consequently, the switching devices may experience significant switching stresses and may incur significant switching losses. Additionally, a hard-switching power converter operates with high slew rate currents and voltages, which may cause electromagnetic interference (EMI) with nearby equipment.

A resonant power converter, in contrast, includes one or more switching devices that switch between their on-states and off-states at substantially zero voltage and/or at substantially zero current. As a result, switching devices in a resonant power converter may experience minimal switching stresses and may incur minimal switching losses. Additionally, a resonant power converter will typically operate with lower slew rate currents and voltages than a hard-switching power converter, which reduces likelihood of EMI with nearby equipment.

DETAILED DESCRIPTION OF THE EMBODIMENTS

Disclosed herein are new resonant power converters which significantly advance the state of the art. The new resonant power converters include coupled inductors, which advantageously act as current multipliers and thereby help minimize resonant power converter equivalent output impedance. Additionally, some embodiments achieve zero voltage switching (ZVS), as well as substantially zero current switching (ZCS), which minimizes switching losses, switching stresses, and likelihood of EMI. Furthermore, certain embodiments of the new resonant power converters may realize higher efficiency than a conventional resonant power converter operating under similar conditions. Moreover, particular embodiments are capable of soft starting without dedicated soft starting elements, and some embodiments may even operate with limited voltage regulation.

Figure 1:
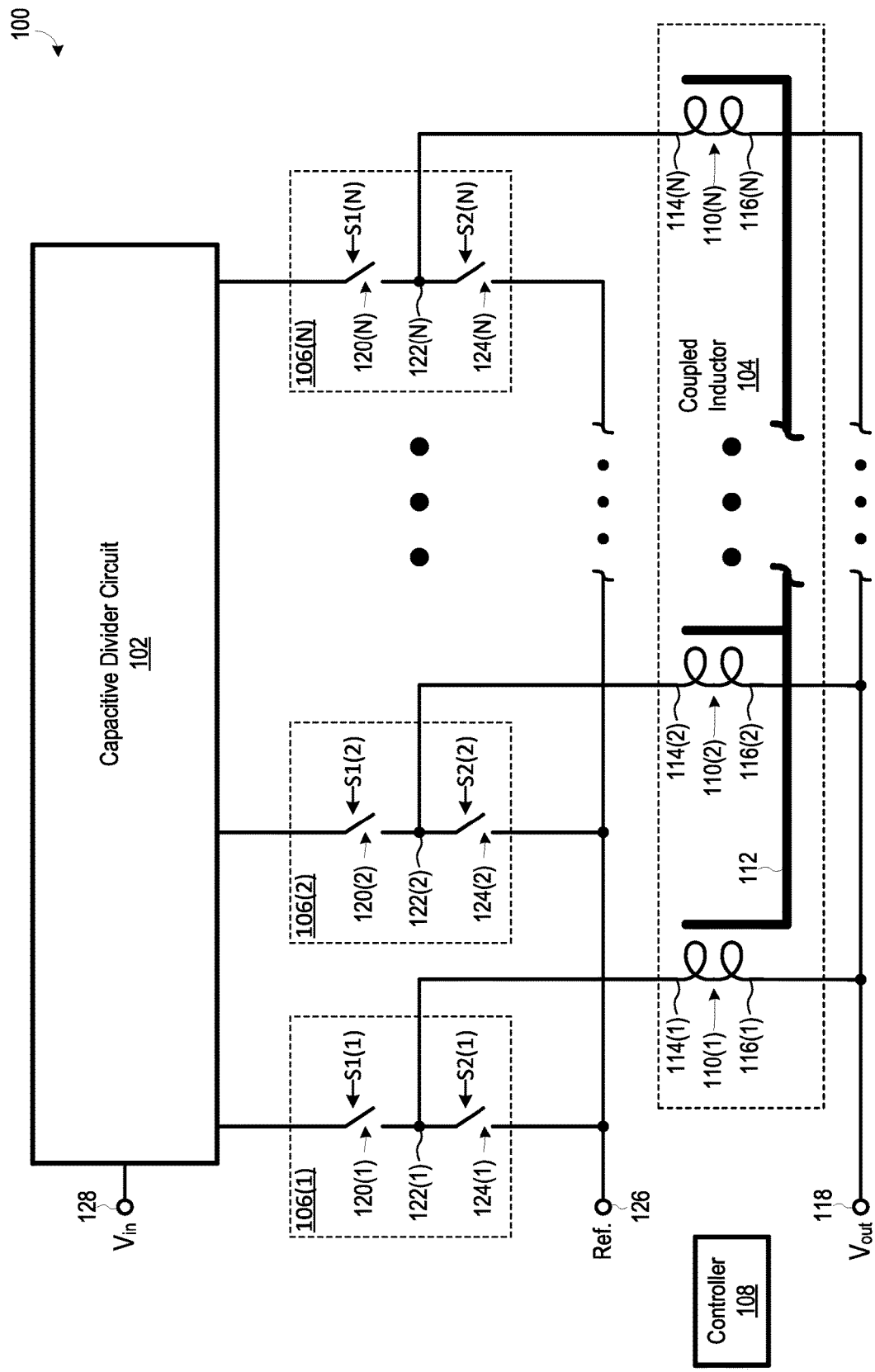
FIG. 1 is a schematic diagram of a resonant power converter including a coupled inductor, according to an embodiment.

FIG. 1 is a schematic diagram of a resonant power converter 100, which is one embodiment of the new resonant power converters disclosed herein. Resonant power converter 100 includes a capacitive divider circuit 102, a coupled inductor 104, N switching stages 106, and a controller 108, where N is an integer greater than two. In this document, specific instances of an item may be referred to by use of a numeral in parentheses (e.g., switching stage 106(1)) while numerals without parentheses refer to any such item (e.g., switching stages 106). Coupled inductor 104 includes N windings 110 magnetically coupled by a magnetic core 112. Magnetic core 112 may be a homogenous magnetic core formed of a single magnetic material, or magnetic core 112 may be a composite magnetic core formed of two or more different magnetic materials. Magnetic core 112 is formed, for example, of a ferrite magnetic material and/or a powder iron magnetic material. In some other embodiments, magnetic core 112 is not a tangible magnetic core but is instead an "air core" which achieves magnetic coupling between windings 110 solely through close physical proximity of the windings. Each winding 110 has a respective first end 114 and a respective second end 116. Second ends 116 of windings 110 are electrically coupled to a common output node 118.

Each switching stage 106 is electrically coupled between a respective winding 110 of coupled inductor 104 and capacitive divider circuit 102. Specifically, each switching stage 106 includes (a) a respective upper switching device 120 electrically coupled between capacitive divider circuit 102 and a switching node 122 of the switching stage and (b) a respective lower switching device 124 electrically coupled between the switching node 122 of the switching stage and a common reference node 126. Accordingly, within each switching stage 106, the upper switching device 120 and the lower switching device 124 are electrically coupled in series between capacitive divider circuit 102 and reference node 126. Reference node 126 is, for example, a ground node. A first end 114 of the respective winding 110 of each switching stage 106 is electrically coupled to the switching node 122 of the switching stage. Each upper switching device 120 is controlled by a respective control signal S1, and each lower switching device 124 is controlled by a respective control signal S2.

Figure 2:
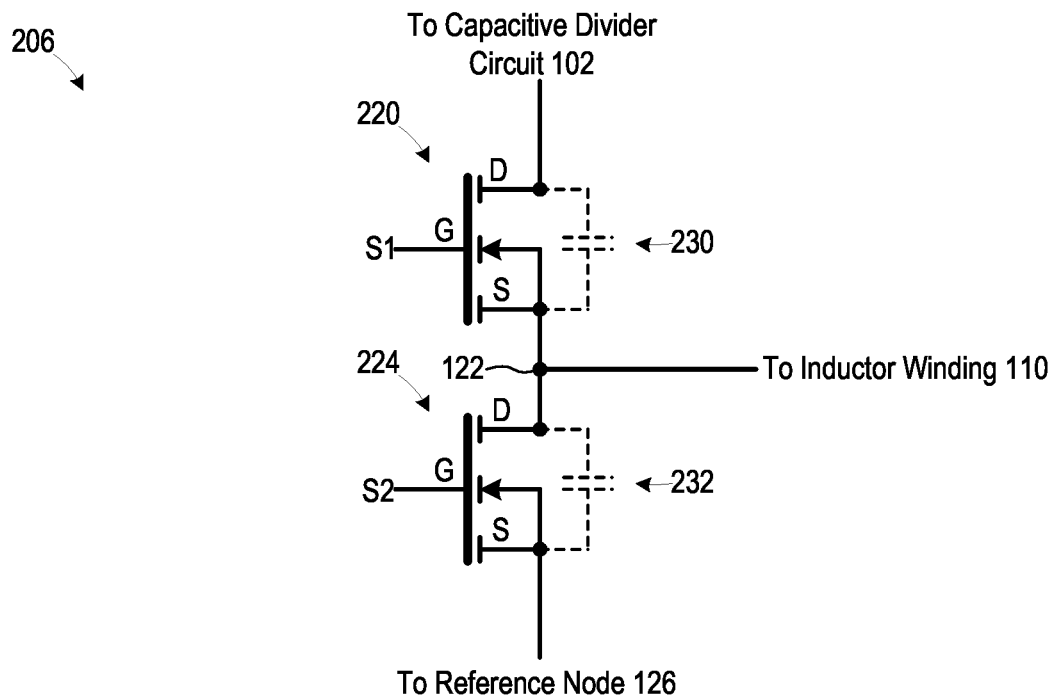
FIG. 2 is a schematic diagram of one embodiment of a switching stage of the FIG. 1 resonant power converter.

In some embodiments, each upper switching device 120 and each lower switching device 124 includes one or more transistors, such as a field effect transistor (FET), a bipolar junction transistor (BJT), and/or an insulated gate bipolar junction transistor (IGBT). For example, FIG. 2 is a schematic diagram of a switching stage 206, which is one possible embodiment of a switching stage 106 instance. Upper switching device 120 is embodied by an enhancement-mode N-channel FET 220, and lower switching device 124 is embodied by an enhancement-mode N-channel FET 224, in switching stage 206. A drain (D) of FET 220 is electrically coupled to capacitive divider circuit 102, a source (S) of FET 220 is electrically coupled to switching node 122, and a gate (G) of FET 220 receives control signal S1. A drain of FET 224 is electrically coupled to switching node 122, a source of FET 224 is electrically coupled to reference node 126, and a gate of FET 224 receives control signal S2. FET 220 has a parasitic drain-to-source capacitance 230, and FET 224 has a parasitic drain-to-source capacitance 232.

Figure 3:
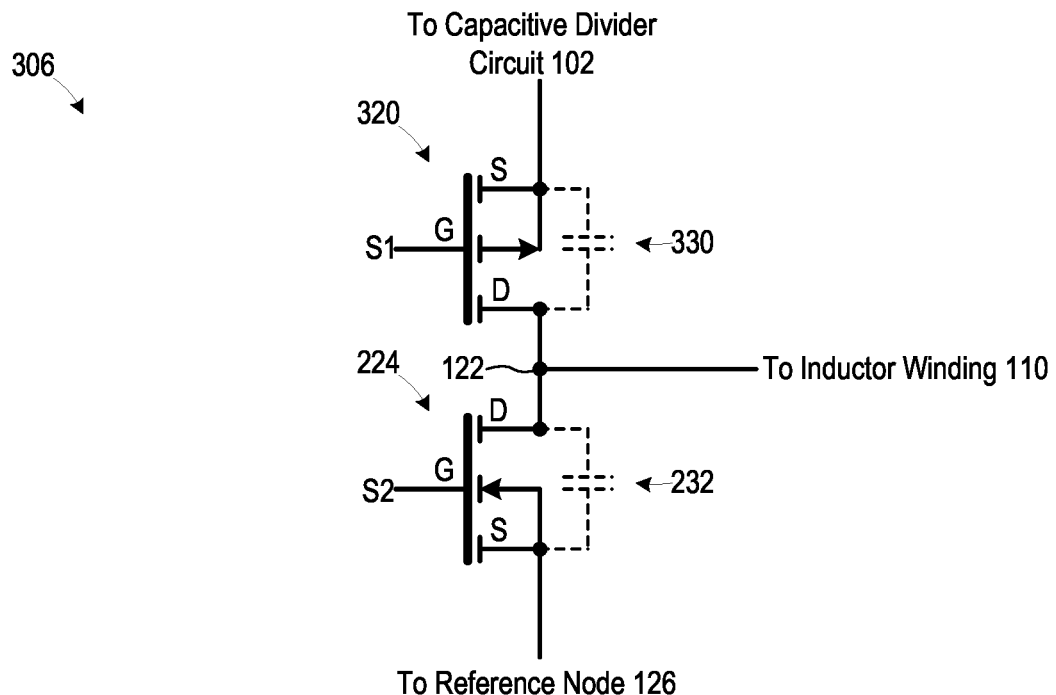
FIG. 3 is a schematic diagram of another embodiment of a switching stage of the FIG. 1 resonant power converter.

As another example of a switching stage including transistors, FIG. 3 is a schematic diagram of a switching stage 306, which is another possible embodiment of a switching stage 106 instance. Switching stage 306 is like switching stage 206 but with enhancement-mode N-channel FET 220 replaced with an enhancement-mode P-channel FET 320. A source of FET 320 is electrically coupled to capacitive divider circuit 102, and a drain of FET 320 is electrically coupled to switching node 122. A gate of FET 320 receives control signal S1. FET 320 has a parasitic source-to-drain capacitance 330. Implementation of upper switching device 122 with a P-channel FET, instead of an N-channel FET, may simplify design of controller 108 by reducing the required magnitude of control signal S1.

Referring again to FIG. 1, capacitive divider circuit 102 is electrically coupled between an input node 128 and each switching stage 106. As discussed below, capacitive divider circuit 102 forms part of a resonant tank circuit of resonant power converter 100. FIGS. 4, 7, 11, 14, 16, 18, 20, and 21, discussed below, illustrate several example embodiments of capacitive divider circuit 102. Resonant power converter 100 optionally further includes (a) an input capacitor (not shown) electrically coupled between input node 128 and reference node 126, and/or (b) an output capacitor (not shown) electrically coupled between output node 118 and reference node 126.

Controller 108 is configured to generate control signals S1 and S2, although connections between controller 108 and switching devices 120 and 124 are not shown for illustrative clarity. Some embodiments of capacitive divider circuit 102 include switching devices (not shown), and in these embodiments, controller 108 is further configured to generate control signals to control switching devices of capacitive divider circuit 102. Controller 108 is formed, for example, of analog electronic circuitry and/or digital electronic circuitry. For example, in certain embodiments, controller 108 is at least partially formed by a processor (not shown) executing instructions in the form of firmware and/or software stored in a memory system (not shown), to generate control signals. Although controller 108 is depicted as a single element, controller 108 may be formed of multiple elements that need not necessarily be disposed at a single location. Additionally, controller 108 could be partially or fully integrated with one or more other elements of resonant converter 100, such as with one or more switching stage 106 instances, without departing from the scope hereof.

Controller 108 is configured to generate control signals S1 and S2 such that switching stages 106 switch out of phase with respect to each other, to convert voltage $V_{in}$ at input node 128 to an output voltage $V_{out}$ at output node 118 (or vice versa). A ratio of $V_{in}$ to $V_{out}$ is dependent on the value of N, i.e., the number of switching stages 106 and respective windings 110, as well as the configuration of capacitive divider circuit 102, during resonant operation of resonant power converter 100. Capacitance of capacitive divider circuit 102 and total leakage inductance of coupled inductor 104, i.e., the sum of respective leakage inductance values of each winding 110, collectively form a resonant tank circuit of resonant power converter 110. Leakage inductance of each winding 110 is associated with magnetic flux generated by current flowing through the winding which does not couple to any other winding 110. Magnetizing inductance of coupled inductor 104, in contrast, is associated with magnetic flux generated by current flowing through any one winding 110 which couples to all other windings 110.

Resonant power converter 100 achieves ZVS switching of upper switching devices 120 and lower switching devices 104. Resonant frequency is determined by total leakage inductance of windings 110, i.e., the sum of leakage inductance of windings 110, as well as the equivalent capacitance value of capacitive divider circuit 102. Magnetizing current magnitude is determined by magnetizing inductance of coupled inductor 104. Resonant frequency and magnetizing current magnitude are selected to achieve ZVS of resonant power converter 100. Applicant has found that ability of resonant power converter 100 to support a large load current magnitude is facilitated by equivalent capacitance of capacitance divider circuit 102 being large. However, large equivalent capacitance of capacitive divider circuit 102 may result in resonant frequency of resonant power converter 100 being undesirably small. Therefore, it is frequently desirable that coupled inductor 104 have a small total leakage inductance to enable equivalent capacitance of capacitive divider circuit 102 to be relatively large without causing resonant frequency of resonant power converter 100 to be undesirably small. Accordingly, in certain embodiments, coupled inductor 104 is configured such that a ratio of magnetizing inductance of coupled inductor 104 to total leakage inductance of coupled inductor 104 is large, i.e., at least 20 to 1 or 30 to 1, and preferably at least 50 to 1, to achieve small total leakage inductance and strong magnetic coupling of windings 110.

Figure 4:
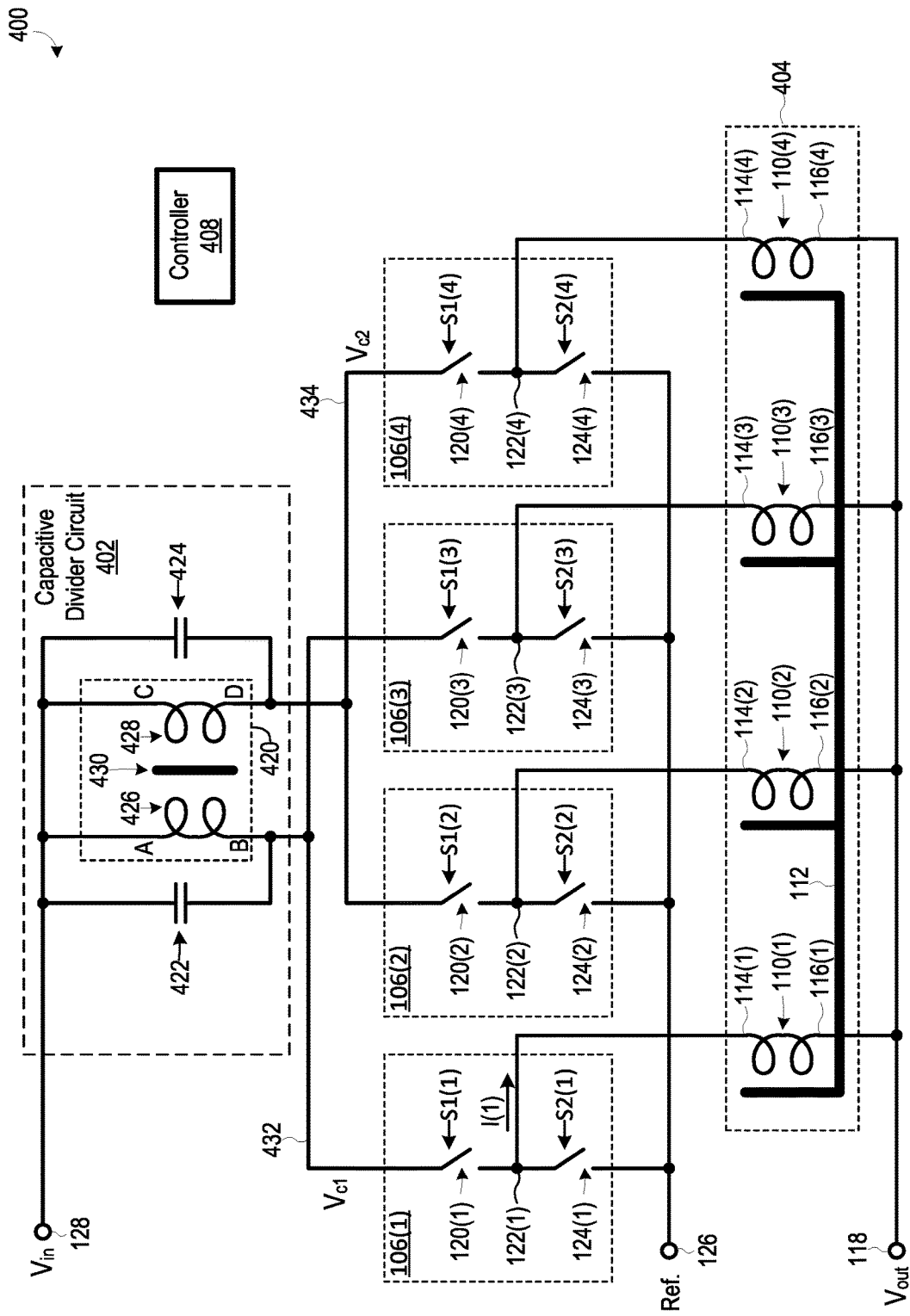
FIG. 4 is a schematic diagram of an embodiment of the FIG. 1 resonant power converter including four switching stages which achieves a four to one voltage conversion ratio.

FIG. 4 is a schematic diagram of a resonant power converter 400, which is one embodiment of resonant power converter 100 of FIG. 1 where N is equal to four. Resonant power converter 400 includes a capacitive divider circuit 402, four instances of switching stage 106, a coupled inductor 404, and a controller 408. Capacitive divider circuit 402 is an embodiment of capacitive divider circuit 102 of FIG. 1, and coupled inductor 404 is an embodiment of coupled inductor 104 of FIG. 1 that includes four instances of winding 110. Controller 408 is an embodiment of controller 108 of FIG. 1.

Capacitor divider circuit 402 includes a transformer 420, a first resonant capacitor 422, and a second resonant capacitor 424. In this document, a "resonant capacitor" is a capacitor that forms some or all of a capacitive portion of a resonant tank circuit of resonant power converter under at least some operating conditions of the resonant power converter. Transformer 420 includes a first transformer winding 426, a second transformer winding 428, and a magnetic core 430 magnetically coupling transformer windings 426 and 428. First transformer winding 426 has opposing ends A and B, and second transformer winding 428 has opposing ends C and D. Magnetic core 430 may be a homogenous magnetic core formed of a single magnetic material, or magnetic core 430 may be a composite magnetic core formed of two or more different magnetic materials. Magnetic core 430 is formed, for example, of a ferrite magnetic material and/or a powder iron magnetic material. In some other embodiments, magnetic core 430 is not a tangible magnetic core but is instead an air core which achieves magnetic coupling between transformer windings 426 and 428 solely through close physical proximity of the windings.

First resonant capacitor 422 and second resonant capacitor 424 are electrically coupled in series between a first capacitor node 432 and a second capacitor node 434. First transformer winding 426 is electrically coupled in parallel with first resonant capacitor 422 between first capacitor node 432 and input node 128. Second transformer winding 428 is electrically coupled in parallel with second resonant capacitor 424 between input node 128 and second capacitor node 434. Capacitive divider circuit 402 forms the capacitive portion of a resonant tank circuit of resonant power converter 400, and capacitive divider circuit 402 has an effective capacitance value equal to the sum of the respective capacitance values of first resonant capacitor 422 and second resonant capacitor 424. Resonant power converter 400 optionally further includes (a) an input capacitor (not shown) electrically coupled between input node 128 and reference node 126, and/or (b) an output capacitor (not shown) electrically coupled between output node 118 and reference node 126.

In each of switching stages 106(1) and 106(3), the upper switching device 120 of the switching stage is electrically coupled between first capacitor node 432 and the first end 114 of the respective winding 110 of the switching stage. Additionally, in each of switching stages 106(1) and 106(3), the lower switching device 124 of the switching stage is electrically coupled between the first end 114 of the respective winding of the switching stage and reference node 126. In each of switching stages 106(2) and 106(4), the upper switching device 120 of the switching stage is electrically coupled between second capacitor node 434 and the first end 114 of the respective winding 110 of the switching stage. Additionally, in each of switching stages 106(2) and 106(4), the lower switching device 124 of the switching stage is electrically coupled between the first end 114 of the respective winding of the switching stage and reference node 126. Accordingly, each of switching stages 106(1) and 106(3) is configured to repeatedly switch the first end 114 of its respective winding 110 between first capacitor node 432 and reference node 126, in response to control signals from controller 108. Similarly, each of switching stages 106(2) and 106(4) is configured to repeatedly switch the first end 114 of its respective winding 110 between second capacitor node 434 and reference node 126, in response to control signals from controller 108.

Figure 5:
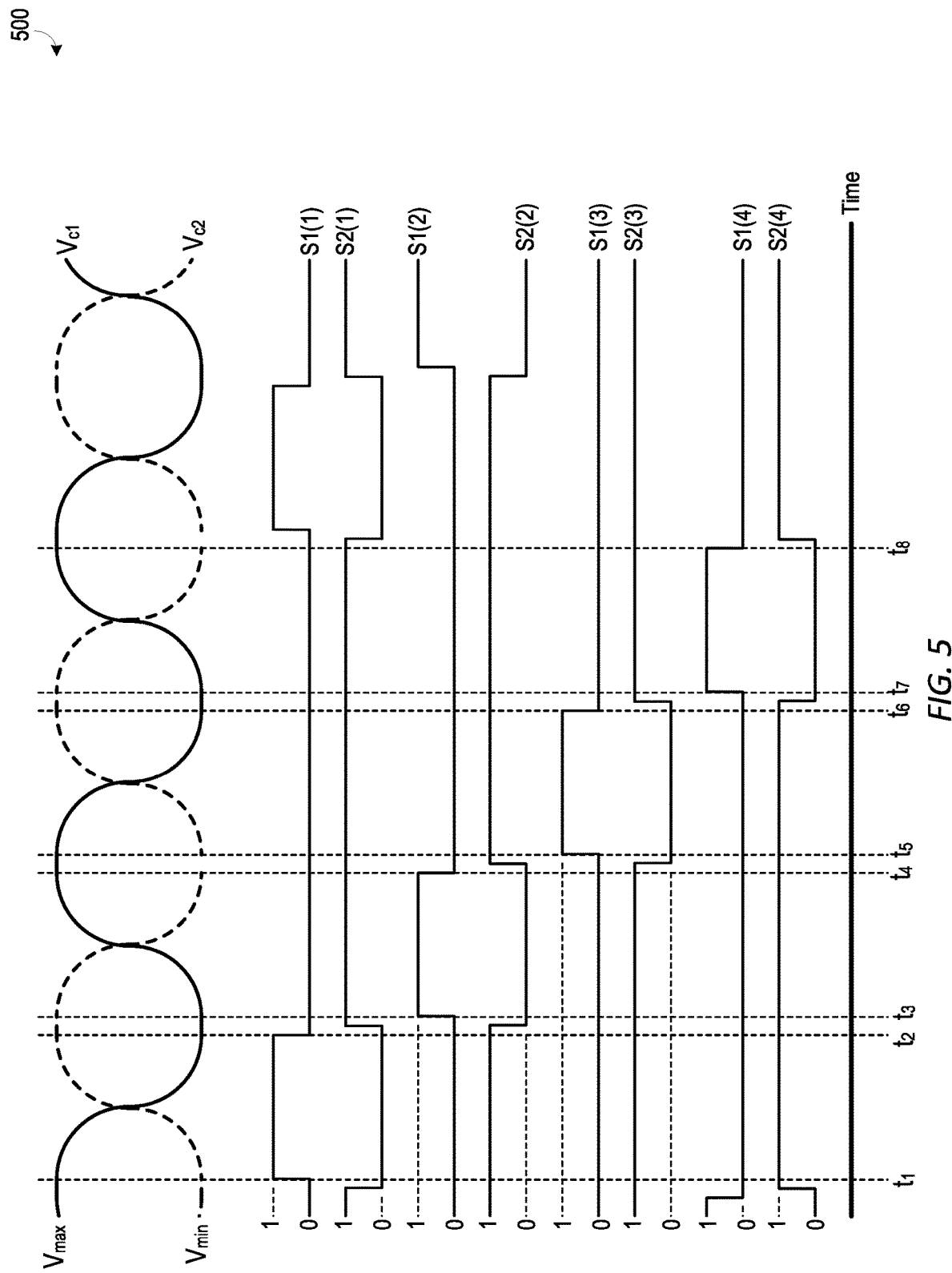
FIGS. 5 and 6 are graphs collectively illustrating one example of operation of the FIG. 4 resonant power converter.
Figure 6:
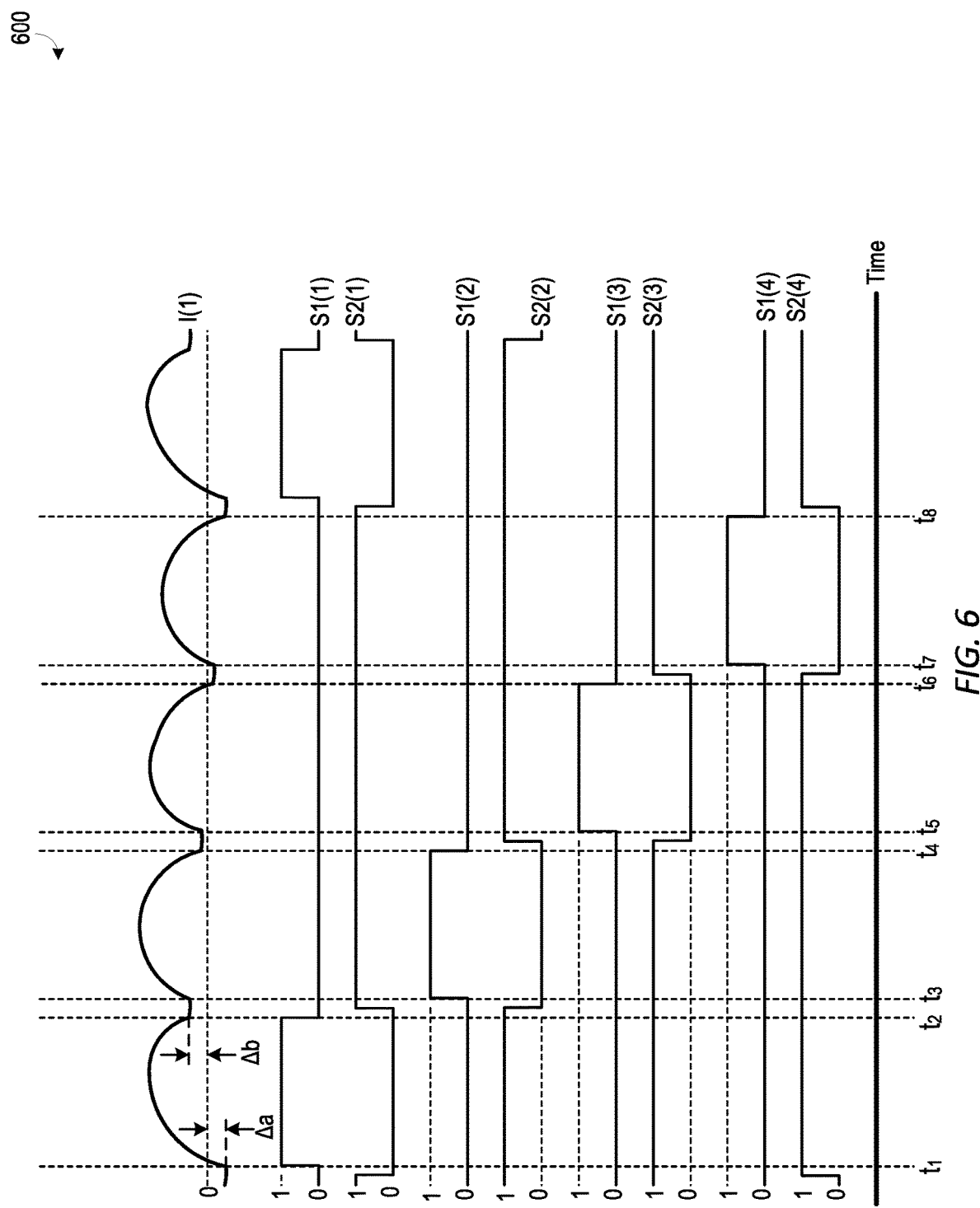

FIG. 5 is a graph 500 and FIG. 6 is a graph 600 collectively illustrating one example of operation of resonant switching power converter 400. Graph 500 includes curves illustrating voltage $V_{c1}$ at first capacitor node 432, voltage $V_{c2}$ at second capacitor node 434, and each of control signals S1 and S2, as a function of time. Graph 600 includes a curve illustrating current I(1) through winding 110(1) as a function of time, and graph 600 also repeats the curves of FIG. 5 illustrating control signals S1 and S2 as a function of time. Each of control signals S1 and S2 is illustrating in FIGS. 5 and 6 as being asserted when in a logic high state and being de-asserted when in a logic low state, where the logic high state is represented by the number "1", and the logic low state is represented by the number "0", in FIGS. 5 and 6. However, any of control signals S1 and S2 could have a different polarity without departing from the scope hereof. For example, in an alternate embodiment, control signals S1 are asserted when in a logic low state, instead of being asserted when in a logic high state.

Within each switching stage 106, each switching device is in its on-state (conductive state) when its respective control signal is asserted, and each switching device is in its off-state (non-conductive state) when its respective control signal is de-asserted. For example, upper switching device 120(1) is in its on-state between times $t_1$ and $t_2$ when respective control signal S1(1) is asserted, and upper switching device 120(1) transitions from its on-state to its off-state at time $t_2$, when control signal S1(1) is de-asserted. Each switching stage 106 switches out of phase with respect to each other switching stage 106 in resonant power converter 400, as evident from FIGS. 5 and 6 where respective control signals S1 for each switching stage 106 are asserted out of phase with respect to each other, such that upper switching devices 120 switch of phase with respect to each other.

As illustrated in FIG. 5, controller 408 generates control signals S1 and S2 such that voltages $V_{c1}$ and $V_{c2}$ are out of phase with respect to each other, and each of these voltages transitions between a maximum value $V_{max}$ and a minimum value $V_{min}$ during an on-state (conductive state) of an upper switching device 120. For example, during an on-state of upper switching device 120(1) between times $t_1$ and $t_2$, voltage $V_{c1}$ transitions from $V_{max}$ to $V_{min}$, and voltage $V_{c2}$ transitions from $V_{min}$ to $V_{max}$. Additionally, each upper switching device 120 switches from its off-state to its on-state when voltage at its respective capacitor node (432 or 434) is $V_{max}$, and each upper switching device 120 switches from its on-state to its off-state when voltage at its respective capacitor node (432 or 434) is $V_{min}$. For example, upper switching device 120(1) switches from its off-state to its on-state at time $t_1$ when voltage at its respective capacitor node (432) is $V_{max}$, and upper switching device 120(1) switches from its on-state to its off state at time $t_2$ when voltage at its respective capacitor node (432) is $V_{min}$. As another example, upper switching device 120(2) switches from its off-state to its on-state at time $t_3$ when voltage at its respective capacitor node (434) is $V_{max}$, and upper switching device 120(2) switches from its on-state to its off state at time $t_4$ when voltage at its respective capacitor node (434) is $V_{min}$.

Each winding end 114 is driven high, i.e. to either first capacitor node 432 or second capacitor node 434, once during each switching cycle of resonant power converter 400, such that winding ends 114 are alternately coupled to first and second capacitor nodes 432 and 434. Specifically, first switching stage 106(1) electrically couples winding end 114(1) to first capacitor node 432 between times $t_1$ and $t_2$, second switching stage 106(2) electrically couples winding end 114(2) to second capacitor node 434 between times $t_3$ and $t_4$, third switching stage 106(3) electrically couples winding end 114(3) to first capacitor node 432 between times $t_5$ and $t_6$, and fourth switching stage 106(4) electrically couples winding end 114(4) to second capacitor node 434 between times $t_7$ and $t_8$.

Current I(1) through winding 110(1), illustrated in FIG. 6, has a sinusoidal component and a triangular component. The sinusoidal component is from current flowing through the resonant tank circuit of resonant power converter 400, while the triangular component is from magnetizing current of coupled inductor 404. Currents through windings 110(2)-110(4) are not illustrated in FIG. 6, but each of these currents has a shape similar to that of current I(1) that is shifted in phase with respect to current I(1). As shown in FIG. 6, current I(1) through winding 110(1) is less than zero by an amount Δa when upper switching device 120(1) turns on (e.g., at time $t_1$), and current I(1) is greater than zero by an amount Δb when upper switching device 120(1) turns off (e.g., at time $t_2$). Magnitude of Δa needs to be the same as magnitude of Δb in switching stage 106(1), and an analogous constraint applies to each of the remaining switching stages 106, to achieve ZVS in these switching stages by charging and discharging switching device parasitic capacitance (e.g. parasitic capacitance 230 and 330 of FIGS. 2 and 3, respectively). Resonant power converter 400 is configured such that magnitude of Δa is equal to magnitude of Δb, for example, by tuning each leakage inductance and magnetizing inductance of coupled inductor 404 during design of resonant power converter 400, to achieve desired values of Δa and Δb. Leakage inductance of coupled inductor 400 affects resonant frequency of resonant power converter 400, and magnetizing inductance of coupled inductor 400 affects magnitude of the triangular component of winding 110 current.

Referring again to FIG. 4, a ratio of $V_{in}$ to $V_{out}$ during resonant operation of resonant power converter 400 is four to one. For example, if $V_{in}$ is 48 volts, $V_{out}$ will be 12 volts. Resonant power converter 400 may be modified to achieve a larger ratio of $V_{in}$ to $V_{out}$ by adding one or more additional pairs of switching stages 106, with a corresponding increase in number of windings 110 in coupled inductor 404 and control signals generated by controller 408. Alternately or additionally, capacitor divider circuit 402 may be modified to achieve a different ratio of $V_{in}$ to $V_{out}$.

Figure 7:
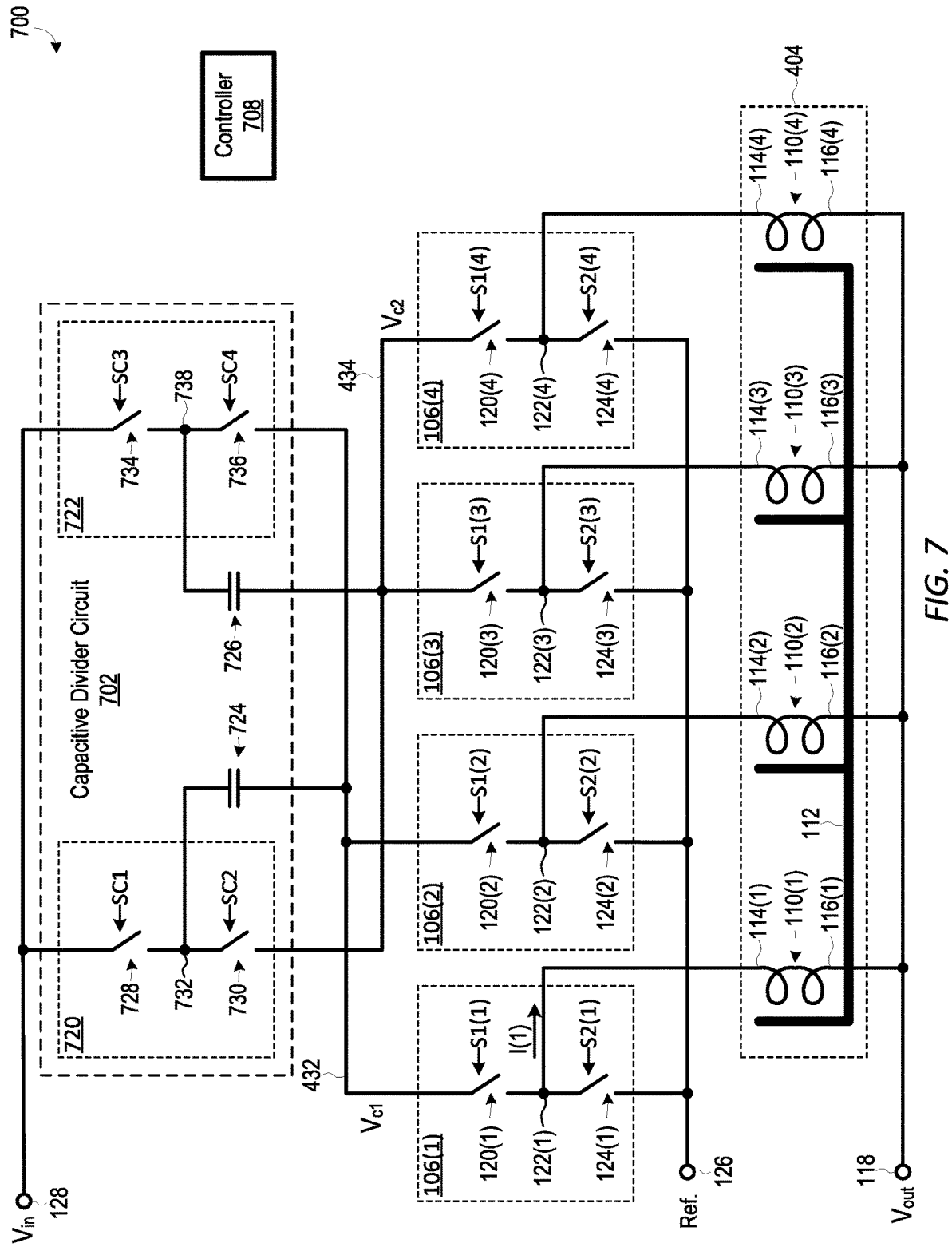
FIG. 7 is a schematic diagram of an embodiment of the FIG. 1 resonant power converter including four switching stages which achieves an eight to one voltage conversion ratio.

For example, FIG. 7 is a schematic diagram of a resonant power converter 700, which is an alternate embodiment of resonant power converter 400 with an alternate capacitive divider circuit, which causes the resonant power converter to achieve a ratio of $V_{in}$ to $V_{out}$ of eight to one. In resonant power converter 700, (a) capacitive divider circuit 402 is replaced with capacitive divider circuit 702 and (b) controller 408 is replaced with controller 708. Additionally, upper switching device 120(2) is electrically coupled to first capacitor node 432 instead of to second capacitor node 434, and upper switching device 120(3) is electrically coupled to second capacitor node 434 instead of to first capacitor node 432. Capacitor divider circuit 702 includes a first capacitor switching stage 720, a second capacitor switching stage 722, a first resonant capacitor 724, and a second resonant capacitor 726. First capacitor switching stage 720 is electrically coupled between input node 128 and second capacitor node 434. Second capacitor switching stage 722 is electrically coupled between input node 128 and first capacitor node 432.

First capacitor switching stage 720 includes (a) a first capacitive divider switching device 728 electrically coupled between input node 128 and a first internal node 732 and (b) a second capacitive divider switching device 730 electrically coupled between first internal node 732 and second capacitor node 434. Second capacitor switching stage 722 includes (a) a third capacitive divider switching device 734 electrically coupled between input node 128 and a second internal node 738 and (b) a fourth capacitive divider switching device 736 electrically coupled between second internal node 738 and first capacitor node 432. First, second, third, and fourth capacitive divider switching devices 728, 730, 734, and 736 are respectively controlled by control signals SC1, SC2, SC3, and SC4 generated by controller 708, although connections between controller 708 and the switching devices are not shown for illustrative clarity. First resonant capacitor 724 is electrically coupled between first internal node 732 and first capacitor node 432, and second resonant capacitor 726 is electrically coupled between second internal node 738 and second capacitor node 434. Capacitive divider circuit 702 forms the capacitive portion of a resonant tank circuit of resonant power converter 700, and capacitive divider circuit 702 has an effective capacitance value equal to the sum of the respective capacitance values of first resonant capacitor 724 and second resonant capacitor 726. Resonant power converter 700 optionally further includes (a) an input capacitor (not shown) electrically coupled between input node 128 and reference node 126, and/or (b) an output capacitor (not shown) electrically coupled between output node 118 and reference node 126.

Figure 8:
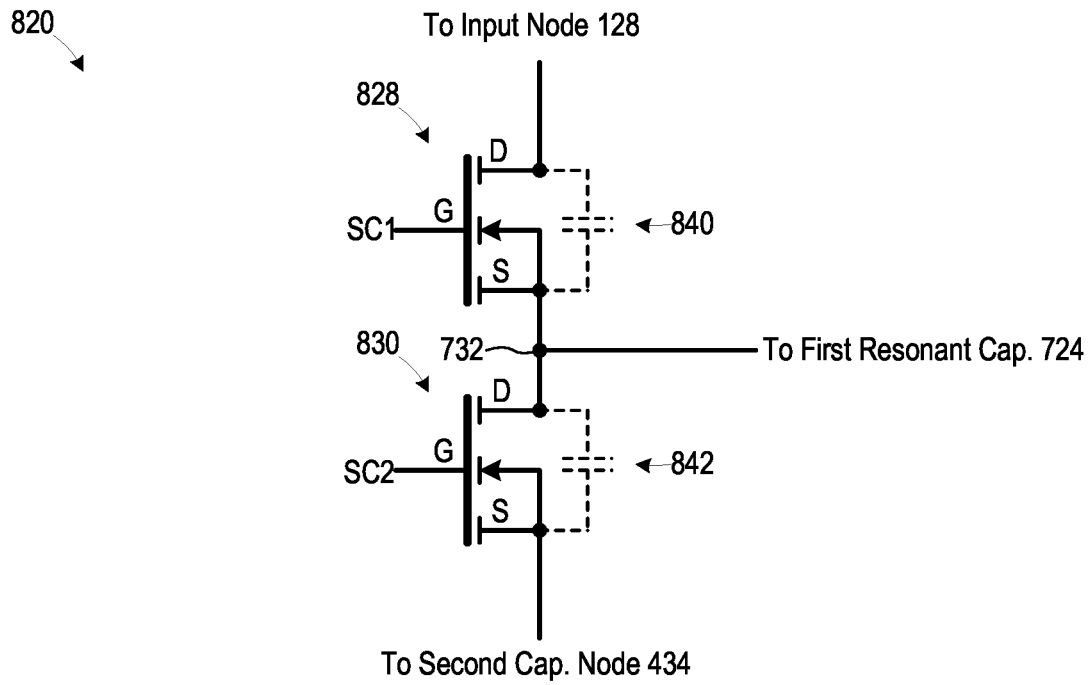
FIG. 8 is a schematic diagram of one embodiment of a capacitor switching stage of the FIG. 7 resonant power converter.

In certain embodiments, each of first, second, third, and fourth capacitive divider switching devices 728, 730, 734, and 736 includes one or more transistors, such as a FET, a BJT, and/or an IGBT. For example, FIG. 8 is a schematic diagram of a capacitor switching stage 820, which is one possible embodiment of first capacitor switching stage 720. First capacitive divider switching device 728 is embodied by an enhancement-mode N-channel FET 828, and second capacitive divider switching device 730 is embodied by an enhancement-mode N-channel FET 830, in capacitor switching stage 820. A drain of FET 828 is electrically coupled to input node 128, a source of FET 828 is electrically coupled to first internal node 732, and a gate of FET 828 receives control signal SC1. A drain of FET 830 is electrically coupled to first internal node 732, a source of FET 830 is electrically coupled to second capacitor node 434, and a gate of FET 830 receives control signal SC2. FET 828 has a parasitic drain-to-source capacitance 840, and FET 830 has a parasitic drain-to-source capacitance 842. Second capacitor switching stage 722 could be embodied in a manner similar to that illustrated in FIG. 8.

Figure 9:
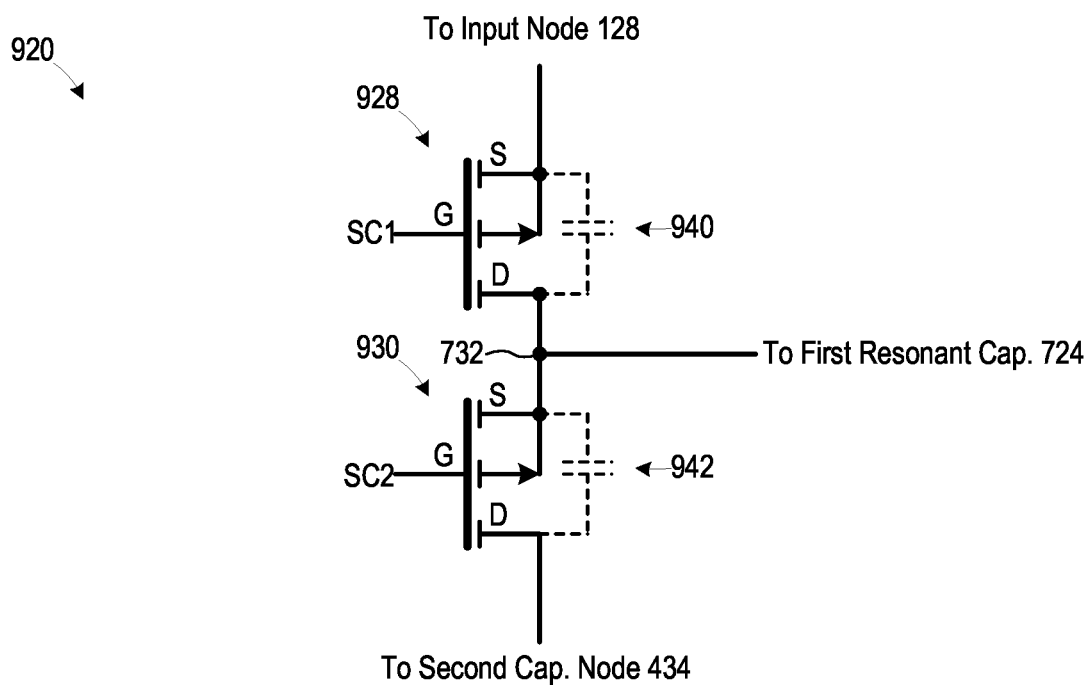
FIG. 9 is a schematic diagram of another embodiment of a capacitor switching stage of the FIG. 7 resonant power converter.

As another example of a capacitor switching stage including transistors, FIG. 9 is a schematic diagram of a capacitor switching stage 920, which is another possible embodiment of first capacitor switching stage 720. First capacitive divider switching device 728 is embodied by an enhancement-mode P-channel FET 928, and second capacitive divider switching device 730 is embodied by an enhancement-mode P-channel FET 930, in capacitor switching stage 920. A source of FET 928 is electrically coupled to input node 128, a drain of FET 928 is electrically coupled to first internal node 732, and a gate of FET 928 receives control signal SC1. A source of FET 930 is electrically coupled to first internal node 732, a drain of FET 930 is electrically coupled to second capacitor node 434, and a gate of FET 930 receives control signal SC2. FET 928 has a parasitic source-to-drain capacitance 940, and FET 930 has a parasitic source-to-drain capacitance 942. Second capacitor switching stage 722 could be embodied in a manner similar to that illustrated in FIG. 9.

Figure 10:
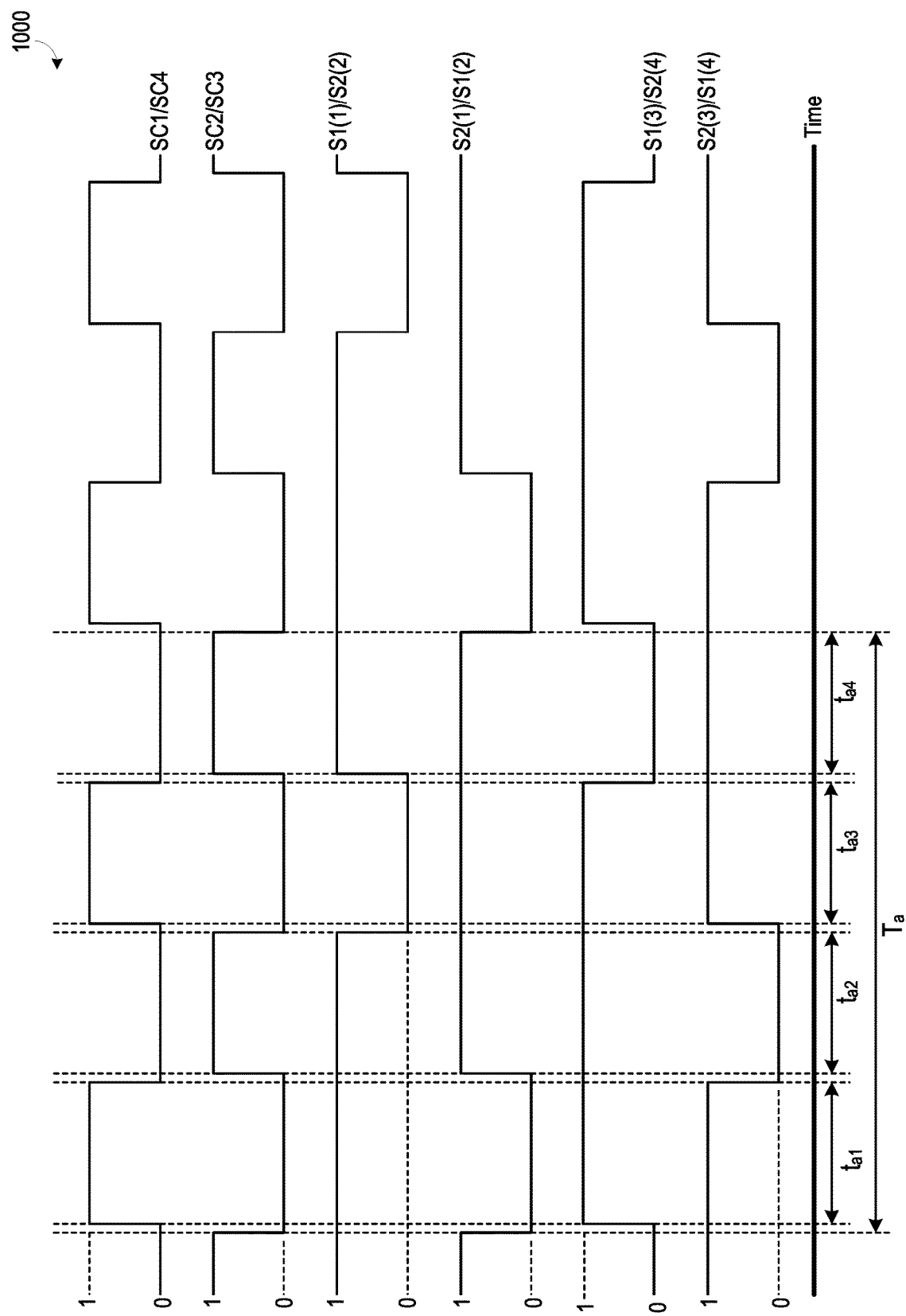
FIG. 10 is a graph illustrating one example of operation of the FIG. 7 resonant power converter.

Referring again to FIG. 7, each of switching stages 106(1) and 106(2) is configured to repeatedly switch the first end 114 of its respective winding 110 between first capacitor node 432 and reference node 126, in response to control signals from controller 108. Additionally, each of switching stages 106(3) and 106(4) is configured to repeatedly switch the first end 114 of its respective winding 110 between second capacitor node 434 and reference node 126, in response to control signals from controller 108. FIG. 10 is a graph 1000 illustrating one example of operation of resonant switching power converter 700. Graph 1000 includes curves illustrating each control signal of resonant power converter 700 as a function of time. Each control signal is illustrating in FIG. 10 as being asserted when in a logic high state and being de-asserted when in a logic low state, where the logic high state is represented by the number "1", and the logic low state is represented by the number "0". However, any of the control signals could have a different polarity without departing from the scope hereof.

As evident from FIG. 10, first capacitive divider switching device 728 and fourth capacitive divider switching device 736 switch in unison, and second capacitive divider switching device 730 and third capacitive divider switching device 734 switch in unison but out of phase with first and fourth capacitive divider switching devices 728 and 736. Each winding end 114 is driven high, i.e. to either first capacitor node 432 or second capacitor node 434, once during each switching cycle $T_a$ of resonant power converter 700, such that winding ends 114 are alternately coupled to first and second capacitor nodes 432 and 434. Specifically, first switching stage 106(1) electrically couples winding end 114(1) to first capacitor node 432 during a time period $t_{a1}$, third switching stage 106(3) electrically couples winding end 114(3) to second capacitor node 434 during a time period $t_{a2}$, second switching stage 106(2) electrically couples winding end 114(2) to first capacitor node 432 during a time period $t_{a3}$, and fourth switching stage 106(4) electrically couples winding end 114(4) to second capacitor node 434 during a time period $t_{a4}$.

Importantly, second resonant capacitor 726 is electrically coupled to reference node 126 and a winding end 114 (fourth capacitive divider switching device 736 connects second internal node 738 and first capacitor node 432), when first resonant capacitor 724 is electrically coupled to a winding end 114 and input node 128. Additionally, first resonant capacitor 724 is electrically coupled to reference node 126 and a winding end 114 (second capacitive divider switching device 730 connects first internal node 732 and second capacitor node 434), when second resonant capacitor 726 is electrically coupled to a winding end 114 and input node 128. Consequently, both resonant capacitors 724 and 726 are always part of a resonant tank circuit for resonant power converter 700. For example, second resonant capacitor 726 is electrically coupled between winding end 114(1) and reference node 126 during time period $t_{a1}$, when upper switching device 120(1) is in its on state and lower switching device 124(1) is in its off state such that first resonant capacitor 724 is electrically coupled to winding end 114(1) and input node 128. As another example, first resonant capacitor 724 is electrically coupled between winding end 114(3) and reference node 126 during time period $t_{a2}$, when upper switching device 120(3) is in its on state and lower switching device 124(3) is in its off state such that second resonant capacitor 726 is electrically coupled to winding end 114(3) and input node 128.

Figure 11:
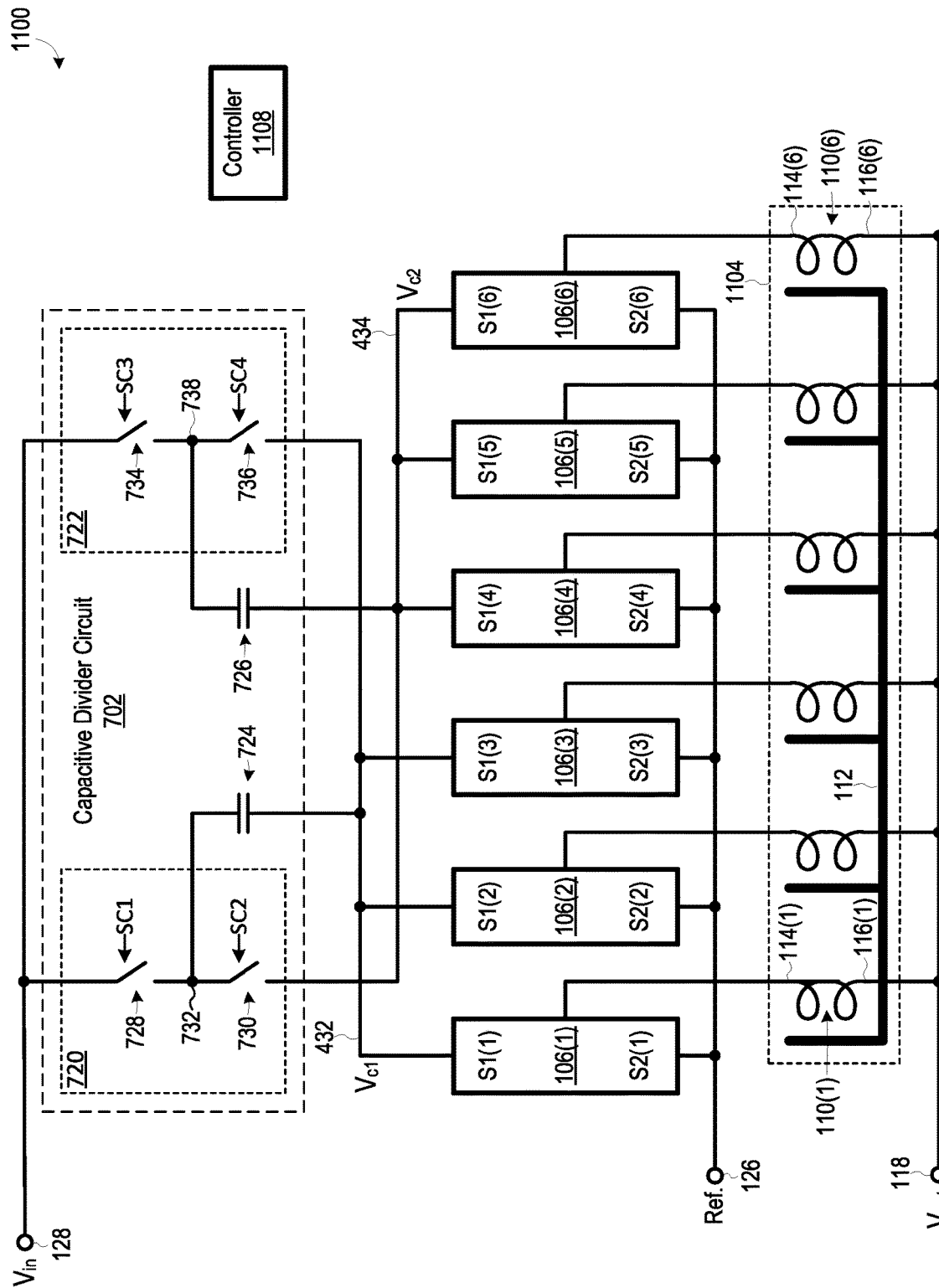
FIG. 11 is a schematic diagram of an alternate embodiment of the FIG. 7 resonant power converter which achieves a twelve to one voltage conversion ratio.

Resonant power converter 700 may be modified to achieve a larger ratio of $V_{in}$ to $V_{out}$ by adding one or more additional pairs of switching stages 106, with a corresponding increase in number of windings 110 in coupled inductor 404 and control signals generated by controller 708. For example, FIG. 11 is a schematic diagram of a resonant power converter 1100 which is an alternate embodiment of resonant power converter 700 which achieves a ratio of $V_{in}$ to $V_{out}$ of 12 to one. Resonant power converter 1100 including six instances of switching stages 106, a coupled inductor 1104, and a controller 1108, along with capacitive divider circuit 702. Each of switching stages 106(1)-106(3) is electrically coupled between first capacitor node 432 and reference node 126, and each of switching stages 106(4)-106(6) is electrically coupled between second capacitor node 434 and reference node 126. Details of switching stages 106 are not shown in FIG. 11 for illustrative clarity, although each switching stage 106 is labeled to show the control signals it receives from controller 1108. For example, switching stage 106(5) is labeled with "S1(5)" and "S2(5)," which indicates that switching stage 106(5) receives control signals S1(5) and S2(5) from controller 1108. Coupled inductor 1104 is an embodiment of coupled inductor 104 that includes six windings 110, although only two windings, i.e. windings 110(1) and 110(6), are labeled in FIG. 11 for illustrative clarity. Controller 1108 is an embodiment of controller 104 configured to generate control signals SC1-SC4, S1(1)-S1 (6), and S2(1)-S2(6).

Figure 12:
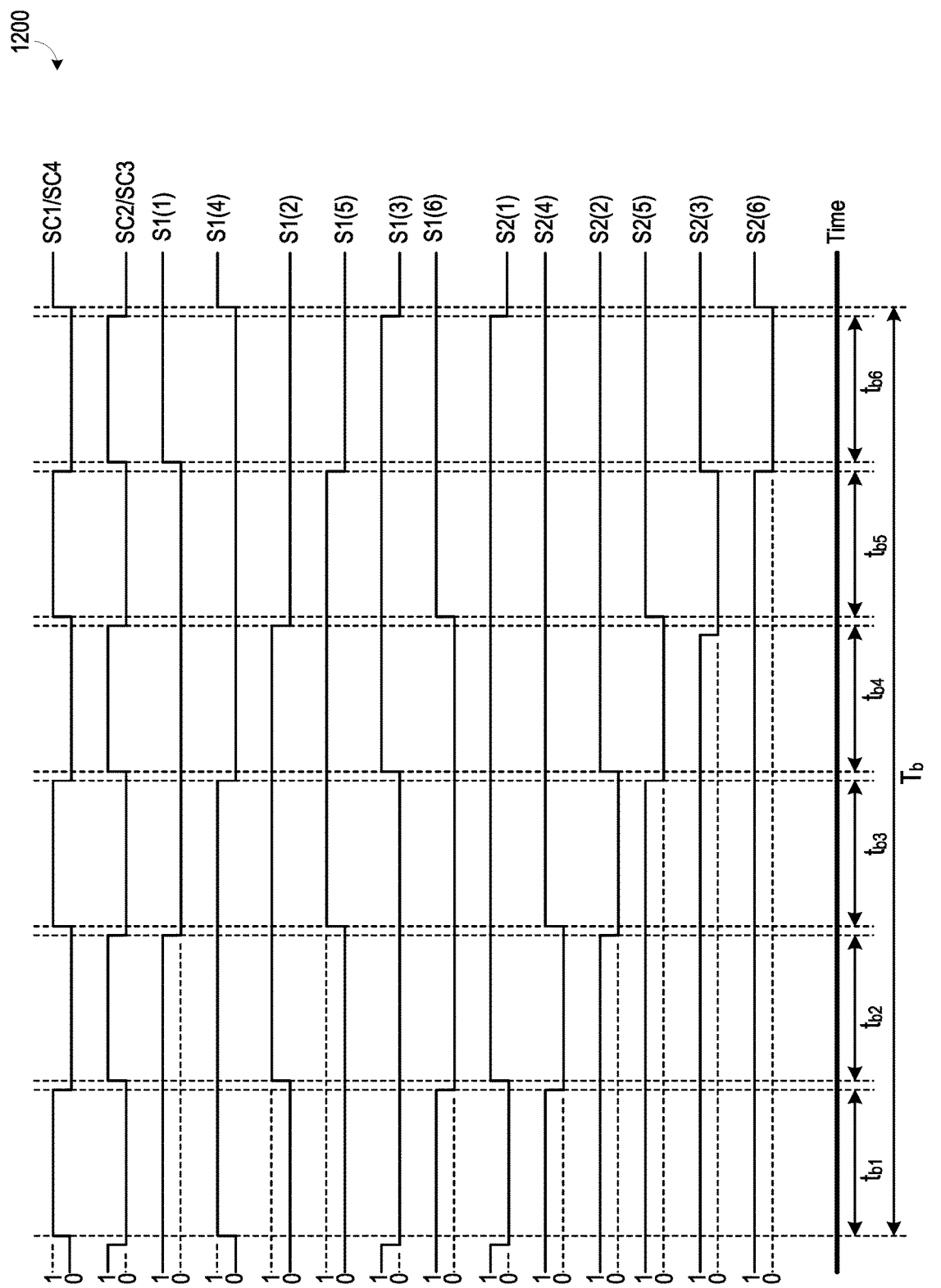
FIG. 12 is a graph illustrating one example of operation of the FIG. 11 resonant power converter.

Each of switching stages 106(1)-106(3) is configured to repeatedly switch the first end 114 of its respective winding 110 between first capacitor node 432 and reference node 126, in response to control signals from controller 108. Additionally, each of switching stages 106(4)-106(6) is configured to repeatedly switch the first end 114 of its respective winding 110 between second capacitor node 434 and reference node 126, in response to control signals from controller 108. FIG. 12 is a graph 1200 illustrating one example of operation of resonant switching power converter 1100. Graph 1200 includes curves illustrating each control signal of resonant power converter 1100 as a function of time. Each control signal is illustrated in FIG. 12 as being asserted when in a logic high state and being de-asserted when in a logic low state, where the logic high state is represented by the number "1", and the logic low state is represented by the number "0". However, any of the control signals could have a different polarity without departing from the scope hereof.

Each winding end 114 is driven high, i.e. to either first capacitor node 432 or second capacitor node 434, once during each switching cycle $T_b$ of resonant power converter 1100, such that winding ends 114 are alternately coupled to first and second capacitor nodes 432 and 434. Specifically, first switching stage 106(1) electrically couples winding end 114(1) to first capacitor node 432 during a time period $t_{b1}$, fourth switching stage 106(4) electrically couples winding end 114(4) to second capacitor node 434 during a time period $t_{b2}$, second switching stage 106(2) electrically couples winding end 114(2) to first capacitor node 432 during a time period $t_{b3}$, fifth switching stage 106(5) electrically couples winding end 114(5) to second capacitor node 434 during a time period $t_{b4}$, third switching stage 106(3) electrically couples winding end 114(3) to first capacitor node 432 during a time period $t_{b5}$, and sixth switching stage 106(6) electrically couples winding end 114(6) to second capacitor node 434 during a time period $t_{b6}$. Similar to as discussed above with respect to FIGS. 7 and 10, second resonant capacitor 726 is electrically coupled to reference node 126 when first resonant capacitor 724 is electrically coupled to a winding end 114, and first resonant capacitor 724 is electrically coupled to reference node 126 when second resonant capacitor 726 is coupled to a winding end 114, so that both resonant capacitors 724 and 726 are always part of a resonant tank circuit for resonant power converter 700.

The control signal pattern of the FIG. 12 example helps minimize number of switching device transitions between the on-state and the off-state during each switching cycle $T_b$ of resonant power converter 1100, thereby helping minimize switching frequency of switching stages 106. However, the pattern of controls signals S1(1)-S1(6) and S2(1)-S2(6) could be varied while still achieving proper operation of resonant power converter 1100.

Figure 13:
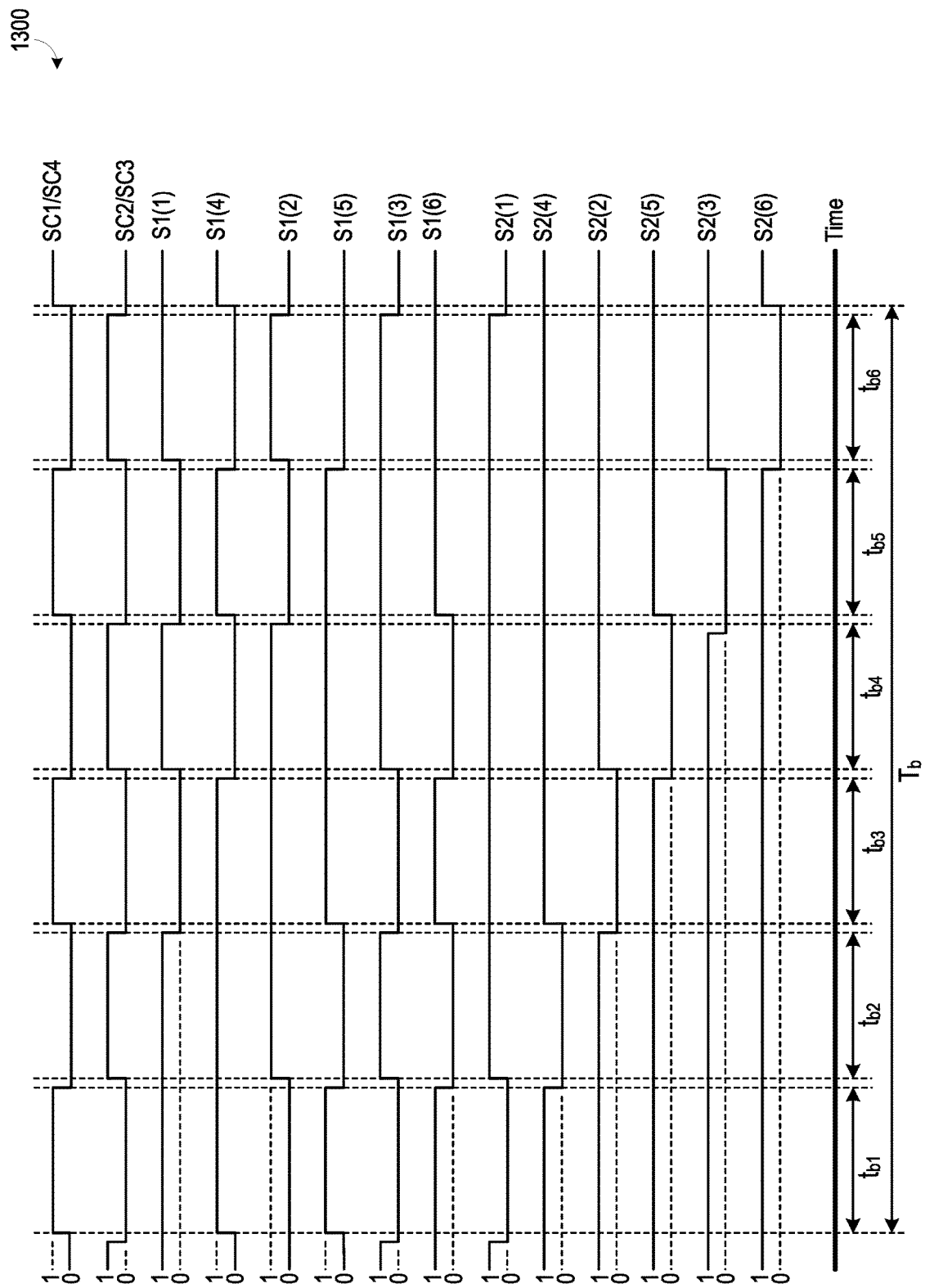
FIG. 13 is a graph illustrating another example of operation of the FIG. 11 resonant power converter.

For example, FIG. 13 is a graph 1300 illustrating an example of operation of resonant switching power converter 1100 with a different control signal pattern than that illustrated in FIG. 12. The FIG. 13 control signal pattern differs from the FIG. 12 control signal pattern in that (a) control signal S1(5) is asserted during time period $t_{b1}$, (b) control signal S1(3) is asserted during time period $t_{b2}$, (c) control signal S1(6) is asserted during time period $t_{b3}$, (d) control signal S1(1) is asserted during time period $t_{b4}$, (e) control signal S1(4) is asserted during time period $t_{b5}$, and (f) control signal S1(2) is asserted during time period $t_{b6}$. The FIG. 13 control signal pattern will achieve lower conduction losses than the FIG. 12 control signal pattern, with the possible drawback of requiring additional switching transitions.

Figure 14:
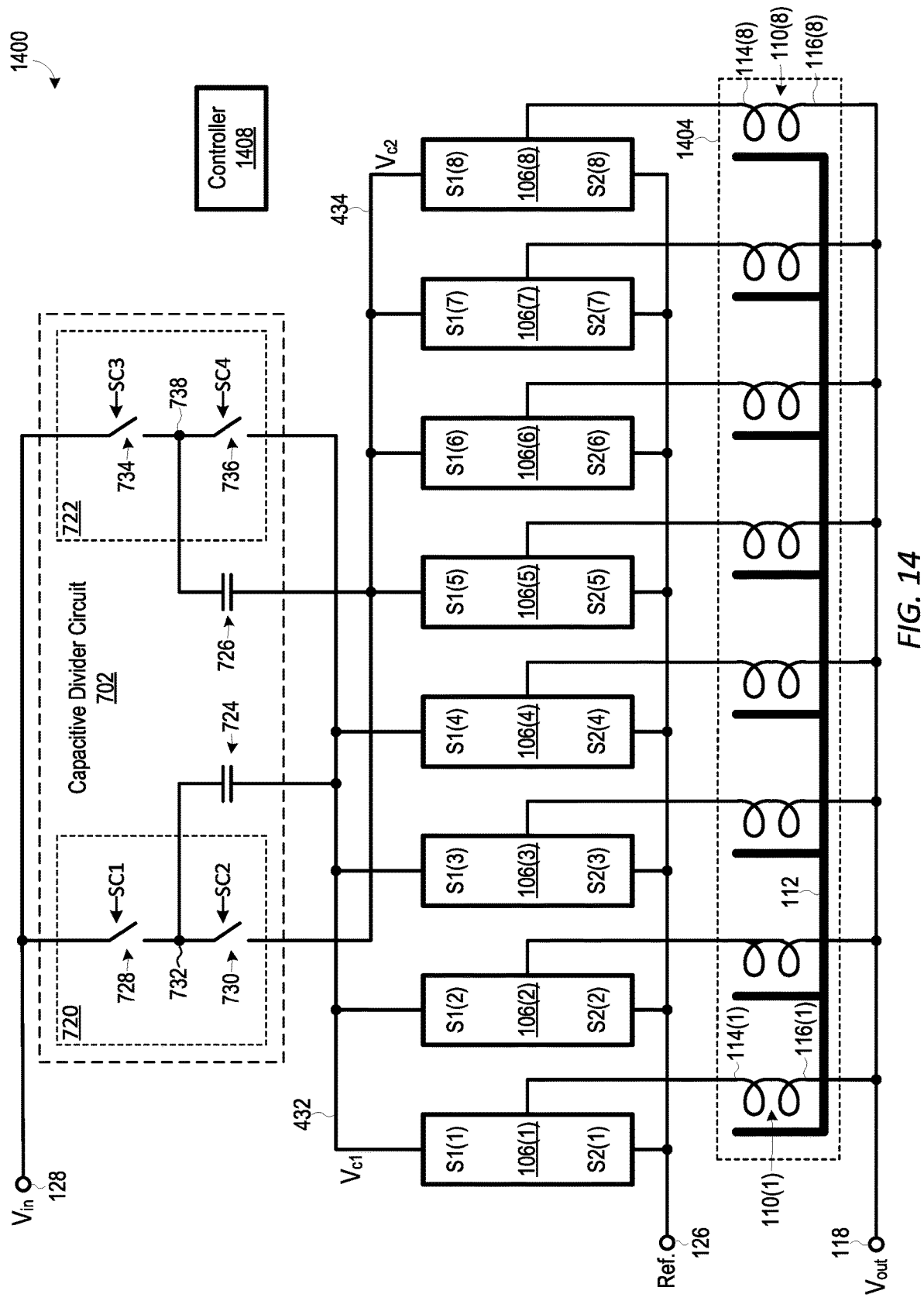
FIG. 14 is schematic diagram of an alternate embodiment of the FIG. 7 resonant power converter which achieves a sixteen to one voltage conversion ratio.

FIG. 14 is a schematic diagram of a resonant power converter 1400 which is an alternate embodiment of resonant power converter 700 which achieves a ratio of $V_{in}$ to $V_{out}$ of 16 to one. Resonant power converter 1400 including eight instances of switching stages 106, a coupled inductor 1404, and a controller 1408, along with capacitive divider circuit 702. Each of switching stages 106(1)-106(4) is electrically coupled between first capacitor node 432 and reference node 126, and each of switching stages 106(5)-106(8) is electrically coupled between second capacitor node 434 and reference node 126. Details of switching stages 106 are not shown in FIG. 14 for illustrative clarity, although each switching stage 106 is labeled to show the control signals it receives from controller 1308. For example, switching stage 106(7) is labeled with "S1(7)" and "S2(7)," which indicates that switching stage 106(7) receives control signals S1(7) and S2(7) from controller 1408. Coupled inductor 1404 is an embodiment of coupled inductor 104 that includes eight windings 110, although only two windings, i.e. windings 110(1) and 110(8), are labeled in FIG. 14 for illustrative clarity. Controller 1408 is an embodiment of controller 108 configured to generate control signals SC1-SC4, S1(1)-S1(8), and S2(1)-S2(8).

Figure 15:
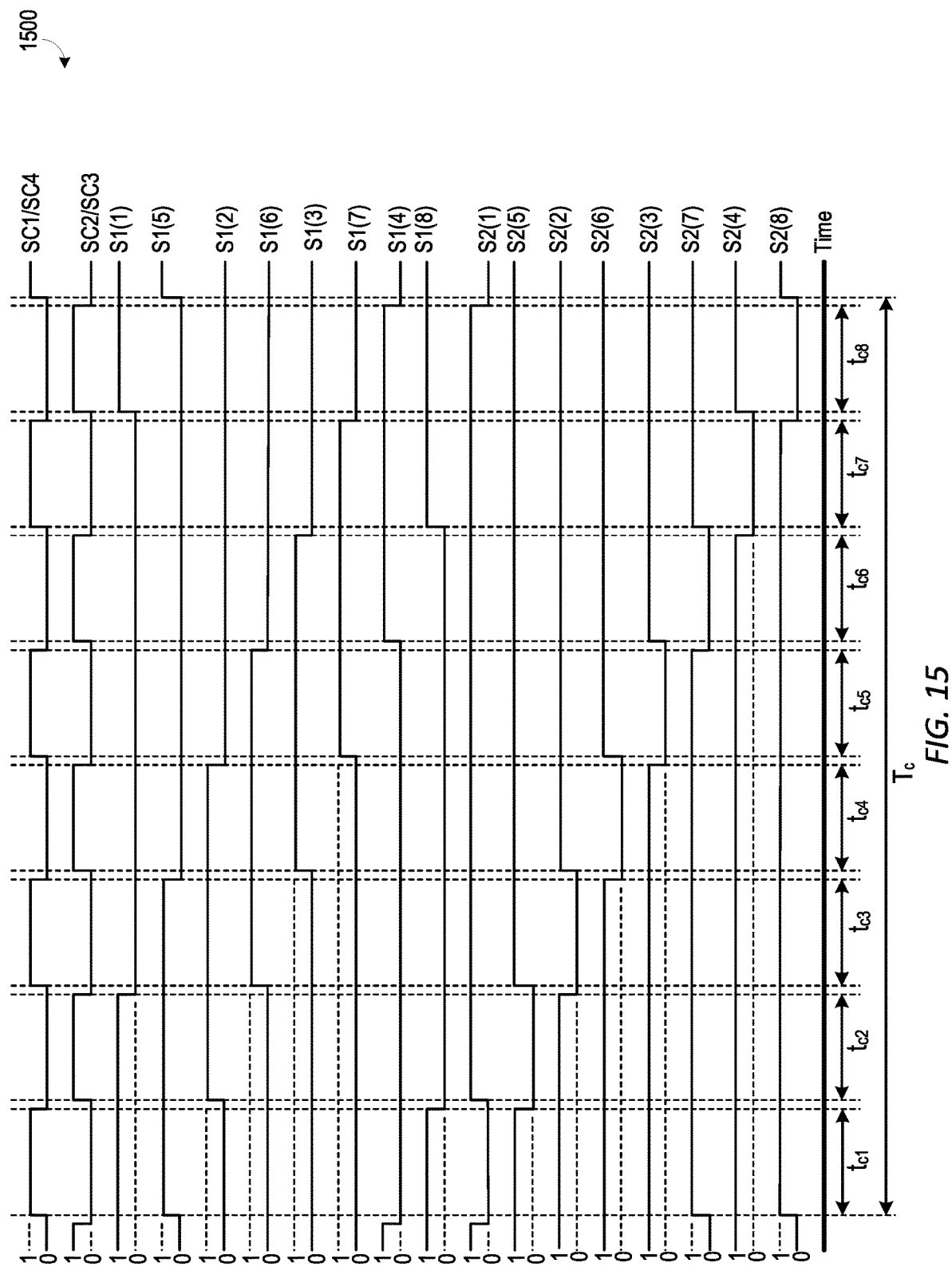
FIG. 15 is a graph illustrating one example of operation of the FIG. 14 resonant power converter.

Each of switching stages 106(1)-106(4) is configured to repeatedly switch the first end 114 of its respective winding 110 between first capacitor node 432 and reference node 126, in response to control signals from controller 1408. Additionally, each of switching stages 106(5)-106(8) is configured to repeatedly switch the first end 114 of its respective winding 110 between second capacitor node 434 and reference node 126, in response to control signals from controller 1408. FIG. 15 is a graph 1500 illustrating one example of operation of resonant switching power converter 1400. Graph 1500 includes curves illustrating each control signal of resonant power converter 1400 as a function of time. Each control signal is illustrating in FIG. 15 as being asserted when in a logic high state and being de-asserted when in a logic low state, where the logic high state is represented by the number "1", and the logic low state is represented by the number "0". However, any of the control signals could have a different polarity without departing from the scope hereof.

Each winding end 114 is driven high, i.e. to either first capacitor node 432 or second capacitor node 434, once during each switching cycle $T_c$ of resonant power converter 1400, such that winding ends 114 are alternately coupled to first and second capacitor nodes 432 and 434. Specifically, first switching stage 106(1) electrically couples winding end 114(1) to first capacitor node 432 during a time period $t_{c1}$, fifth switching stage 106(5) electrically couples winding end 114(5) to second capacitor node 434 during a time period $t_{c2}$, second switching stage 106(2) electrically couples winding end 114(2) to first capacitor node 432 during a time period $t_{c3}$, sixth switching stage 106(6) electrically couples winding end 114(6) to second capacitor node 434 during a time period $t_{c4}$, third switching stage 106(3) electrically couples winding end 114(3) to first capacitor node 434 during a time period $t_{c5}$, seventh switching stage 106(7) electrically couples winding end 114(7) to second capacitor node 434 during a time period $t_{c6}$, fourth switching stage 106(4) electrically couples winding end 114(4) to first capacitor node 432 during a time period $t_{c7}$, and eighth switching stage 106(8) electrically couples winding end 114(8) to second capacitor node 434 during a time period $t_{c8}$. Similar to as discussed above with respect to FIGS. 7 and 10, second resonant capacitor 726 is electrically coupled to reference node 126 when first resonant capacitor 724 is electrically coupled to a winding end 114, and first resonant capacitor 724 is electrically coupled to reference node 126 when second resonant capacitor 726 is coupled to a winding end 114, so that both resonant capacitors 724 and 726 are always part of a resonant tank circuit for resonant power converter 1400.

The control signal pattern of the FIG. 15 example helps minimize number of switching device transitions between the on-state and the off-state during each switching cycle $T_c$ of resonant power converter 1400, thereby helping minimize switching frequency of switching stages 106. However, the pattern of controls signals S1(1)-S1(8) and S2(1)-S2(8) could be varied while still achieving proper operation of resonant power converter 1400. For example, the pattern of controls signals S1(1)-S1(8) and S2(1)-S2(8) could be modified to reduce conduction losses, with the possible drawback of requiring additional switching transitions, in manner analogous to that discussed above with respect FIG. 13.

N is an even integer in the resonant power converters of FIGS. 4, 7, 11, and 14. However, capacitive divider circuit 102 could be configured to support embodiments of resonant power converter 100 where N is an odd integer greater than or equal to three, with the drawback of increased resonant current magnitude and associated conduction losses.

Figure 16:
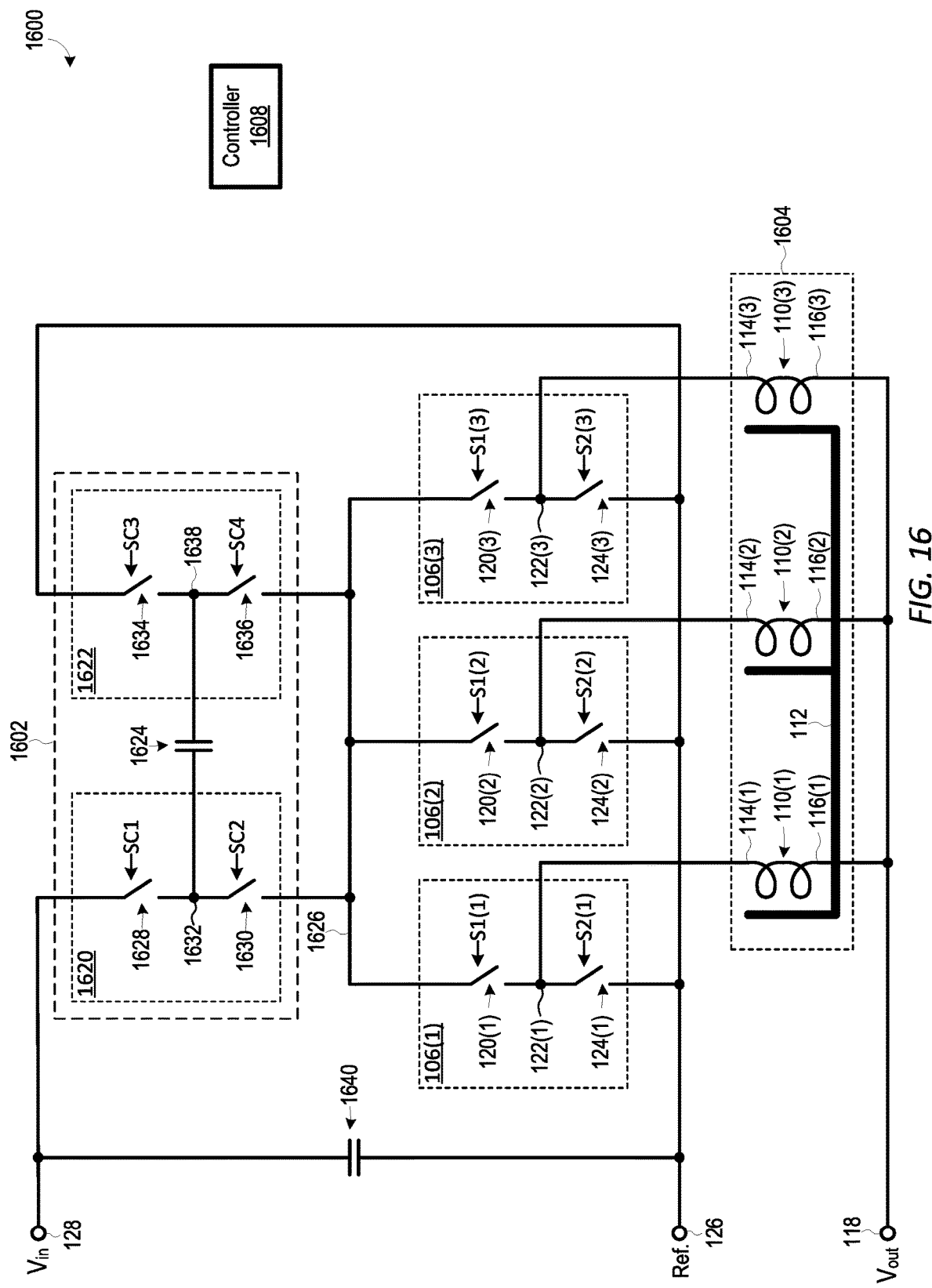
FIG. 16 is a schematic diagram of a resonant power converter including three switching stages which achieves a six to one voltage conversion ratio, according to an embodiment.

For example, FIG. 16 is a schematic diagram of a resonant power converter 1600, which is one embodiment of resonant power converter 100 of FIG. 1 where N is equal to three and a ratio of $V_{in}$ to $V_{out}$ is six to one. Resonant power converter 1600 includes a capacitive divider circuit 1602, three instances of switching stage 106, a coupled inductor 1604, and a controller 1608. Capacitive divider circuit 1602 is an embodiment of capacitive divider circuit 102 of FIG. 1, and coupled inductor 1604 is an embodiment of coupled inductor 104 of FIG. 1 that includes three instances of winding 110. Controller 1608 is an embodiment of controller 108 of FIG. 1. Resonant power converter 1600 may be modified to achieve a larger ratio of $V_{in}$ to $V_{out}$ by adding one or more additional pairs of switching stages 106, with a corresponding increase in number of windings 110 in coupled inductor 1604 and control signals generated by controller 1608, as long as N is an odd integer.

Capacitor divider circuit 1602 includes a first capacitor switching stage 1620, a second capacitor switching stage 1622, and a resonant capacitor 1624. First capacitor switching stage 1620 is electrically coupled between input node 128 and a capacitor node 1626. Second capacitor switching stage 1622 is electrically coupled between reference node 126 and capacitor node 1626. First capacitor switching stage 1620 includes (a) a first capacitive divider switching device 1628 electrically coupled between input node 128 and a first internal node 1632 and (b) a second capacitive divider switching device 1630 electrically coupled between first internal node 1632 and capacitor node 1626. Second capacitor switching stage 1622 includes (a) a third capacitive divider switching device 1634 electrically coupled between reference node 126 and a second internal node 1638 and (b) a fourth capacitive divider switching device 1636 electrically coupled between second internal node 1638 and capacitor node 1626. In certain embodiments, each of first, second, third, and fourth capacitive divider switching devices 1628, 1630, 1634, and 1636 includes one or more transistors, such as a FET, a BJT, and/or an IGBT. In some embodiments, each of first capacitor switching stage 1620 and second capacitor switching stage 1622 has a configuration similar to that illustrated in FIG. 8 or FIG. 9.

First, second, third, and fourth capacitive divider switching devices 1628, 1630, 1634, and 1636 are respectively controlled by control signals SC1, SC2, SC3, and SC4 generated by controller 1608, although connections between controller 1608 and the switching devices are not shown for illustrative clarity. Capacitive divider circuit 1602 forms the capacitive portion of a resonant tank circuit of resonant power converter 1600, and capacitive divider circuit 1602 has an effective capacitance value equal to the capacitance value of resonant capacitor 1624. Resonant power converter 1600 optionally further includes an input capacitor 1640 electrically coupled between input node 128 and reference node 126, such as to provide a bypass path for input ripple current. Input capacitor 1640, if present, should have a capacitance value that is significantly greater than a capacitance value of resonant capacitor 1624 so that input capacitor 1640 does not materially affect resonant frequency of resonant power converter 1600. Resonant power converter 1600 optionally further includes an output capacitor (not shown) electrically coupled between output node 118 and reference node 126.

Figure 17:
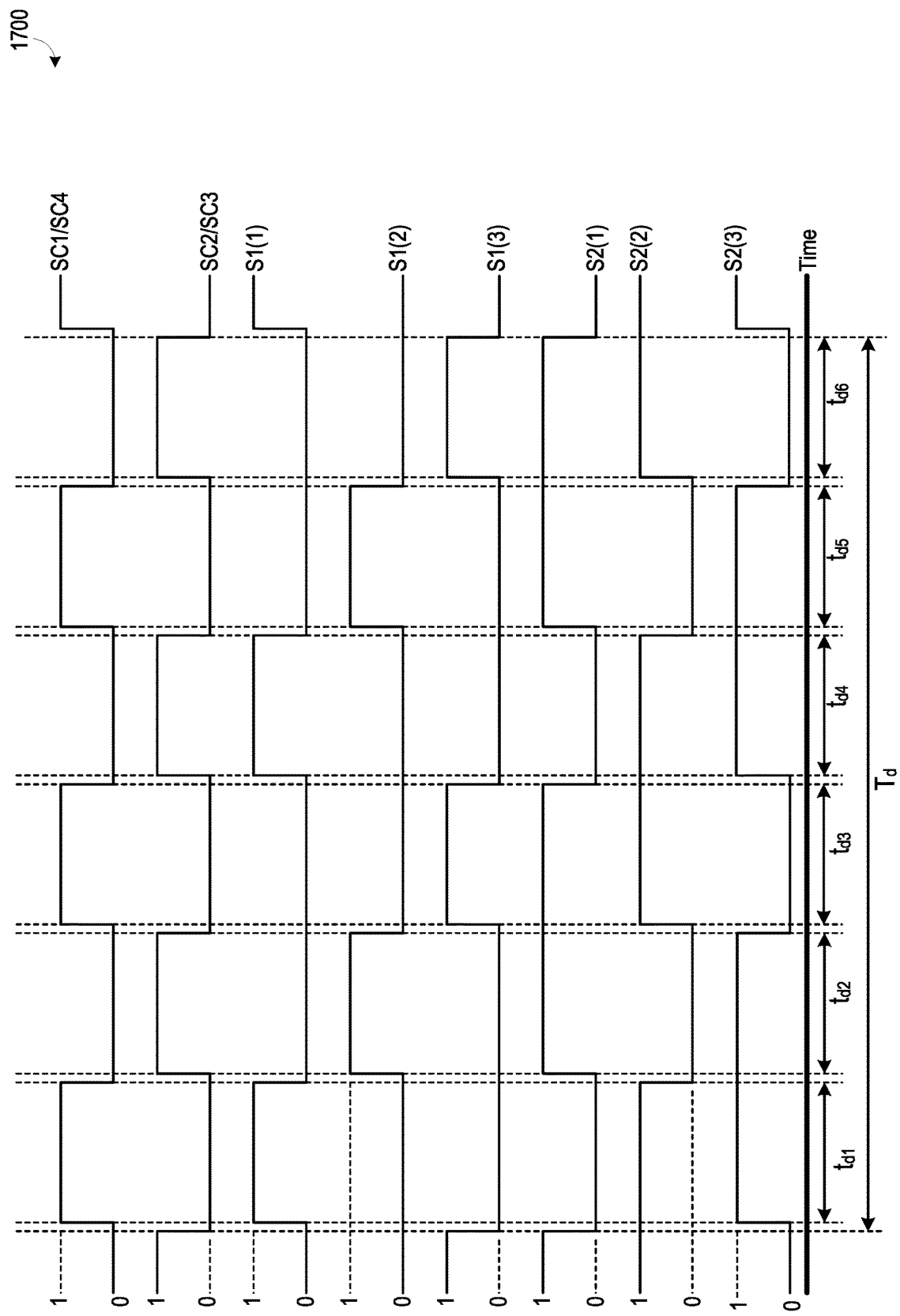
FIG. 17 is a graph illustrating one example of operation of the FIG. 16 resonant power converter.

Each switching stage 106 is electrically coupled between capacitor node 1626 and reference node 126, and each switching stage 106 is configured to repeatedly switch the first end 114 of its respective winding 110 between capacitor node 1626 and reference node 126, in response to control signals from controller 108. FIG. 17 is a graph 1700 illustrating one example of operation of resonant switching power converter 1600. Graph 1700 includes curves illustrating each control signal of resonant power converter 1600 as a function of time. Each control signal is illustrating in FIG. 17 as being asserted when in a logic high state and being de-asserted when in a logic low state, where the logic high state is represented by the number "1", and the logic low state is represented by the number "0". However, any of the control signals could have a different polarity without departing from the scope hereof.

As evident from FIG. 17, first capacitive divider switching device 1628 and fourth capacitive divider switching device 1636 switch in unison, and second capacitive divider switching device 1630 and third capacitive divider switching device 1634 switch in unison but out of phase with first and fourth capacitive divider switching devices 1628 and 1636. Each switching stage 106 switches its respective winding end 114 between capacitor node 1626 and reference node 126 in response to control signals S1 and S2 generated by controller 1608. Each winding end 114 is driven high, i.e. to capacitor node 1626, once during each switching cycle $T_d$ of resonant power converter 1600, such that winding ends 114 are driven high out of phase with respect to each other. Specifically, first switching stage 106(1) electrically couples winding end 114(1) to capacitor node 1626 during a time period $t_{d1}$, second switching stage 106(2) electrically couples winding end 114(2) to capacitor node 1626 during a time period $t_{d2}$, third switching stage 106(3) electrically couples winding end 114(3) to capacitor node 1626 during a time period $t_{d3}$, first switching stage 106(1) electrically couples winding end 114(1) to capacitor node 1626 during a time period $t_{d4}$, second switching stage 106(2) electrically couples winding end 114(2) to capacitor node 1626 during a time period $t_{d5}$, and third switching stage 106(3) electrically couples winding end 114(3) to capacitor node 1626 during a time period $t_{d6}$. Resonant capacitor 1624 is electrically coupled between input node 128 and capacitor node 1626 during time periods $t_{d1}$, $t_{d3}$, and $t_{d5}$, and resonant capacitor 1624 is electrically coupled between reference node 126 and capacitor node 1626 during time periods $t_{d2}$, $t_{d4}$, and $t_{d6}$.

Figure 18:
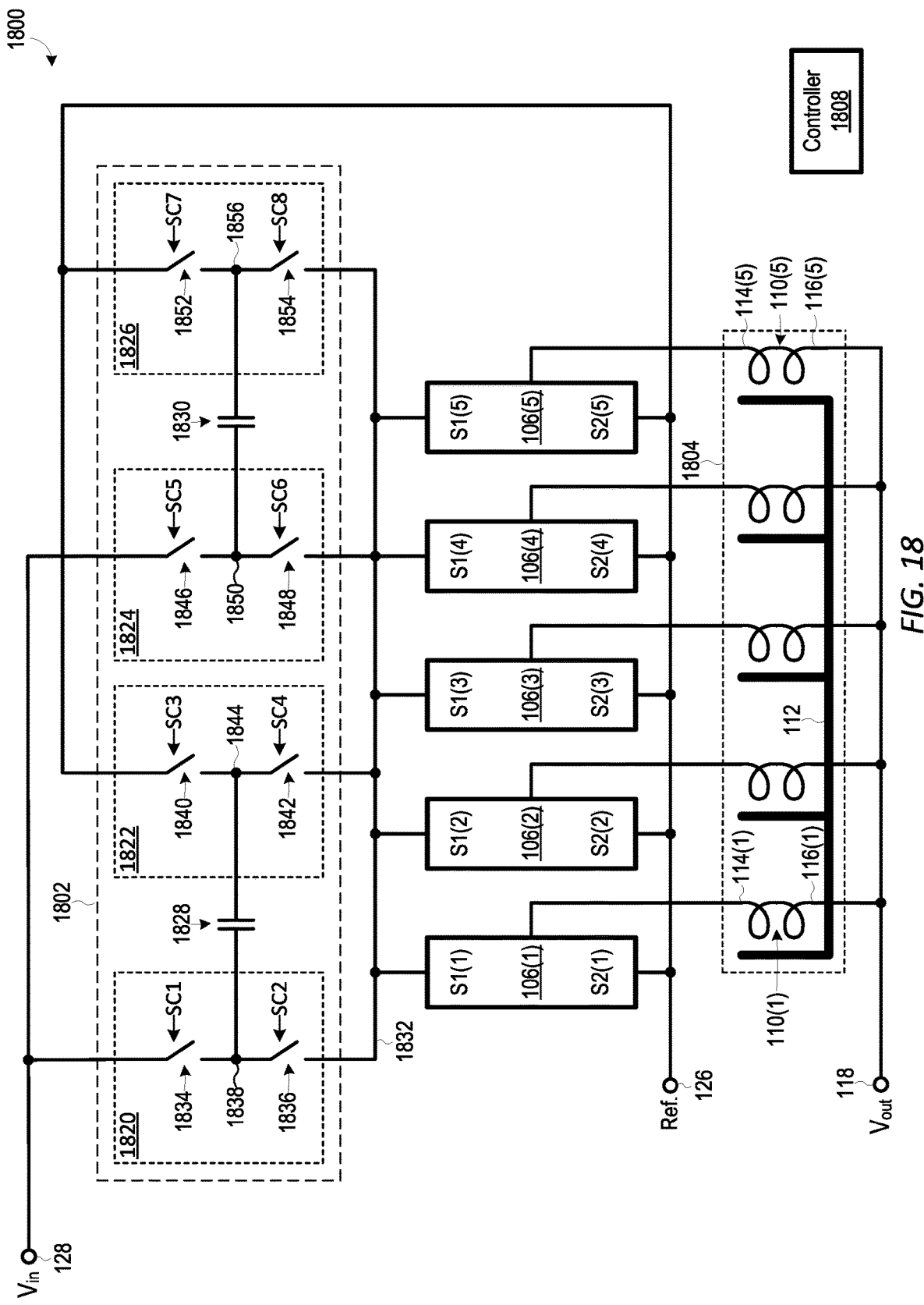
FIG. 18 is a schematic diagram of a resonant power converter including five switching stages which achieves a ten to one voltage conversion ratio, according to an embodiment.

FIG. 18 is a schematic diagram of a resonant power converter 1800, which is one embodiment of resonant power converter 100 of FIG. 1 where N is equal to five and a ratio of $V_{in}$ to $V_{out}$ is ten to one. Resonant power converter 1800 includes a capacitive divider circuit 1802, five instances of switching stage 106, a coupled inductor 1804, and a controller 1808. Capacitive divider circuit 1802 is an embodiment of capacitive divider circuit 102 of FIG. 1, and coupled inductor 1804 is an embodiment of coupled inductor 104 of FIG. 1 that includes five instances of winding 110. Only two instances of winding 110, i.e., winding 110(1) and 110(5), are labeled in FIG. 18 for illustrative clarity. Controller 1808 is an embodiment of controller 108 of FIG. 1. Details of switching stages 106 are not shown in FIG. 18 for illustrative clarity, although each switching stage 106 is labeled to show the control signals it receives from controller 1808. For example, switching stage 106(5) is labeled with "S1(5)" and "S2(5)," which indicates that switching stage 106(5) receives control signals S1(5) and S2(5) from controller 1808. Resonant power converter 1800 may be modified to achieve a larger ratio of $V_{in}$ to $V_{out}$ by adding one or more additional pairs of switching stages 106, with a corresponding increase in number of windings 110 in coupled inductor 1804 and control signals generated by controller 1808, as long as N is an odd integer.

Capacitor divider circuit 1802 includes a first capacitor switching stage 1820, a second capacitor switching stage 1822, a third capacitor switching stage 1824, a fourth capacitor switching stage 1826, a first resonant capacitor 1828, and a second resonant capacitor 1830. Each of first capacitor switching stage 1820 and third capacitor switching stage 1824 is electrically coupled between input node 128 and a capacitor node 1832. Each of second capacitor switching stage 1822 and fourth capacitor switching stage 1826 is electrically coupled between reference node 126 and capacitor node 1832. First capacitor switching stage 1820 includes (a) a first capacitive divider switching device 1834 electrically coupled between input node 128 and a first internal node 1838 and (b) a second capacitive divider switching device 1836 electrically coupled between first internal node 1838 and capacitor node 1832. Second capacitor switching stage 1822 includes (a) a third capacitive divider switching device 1840 electrically coupled between reference node 126 and a second internal node 1844 and (b) a fourth capacitive divider switching device 1842 electrically coupled between second internal node 1844 and capacitor node 1832. Third capacitor switching stage 1824 includes (a) a fifth capacitive divider switching device 1846 electrically coupled between input node 128 and a third internal node 1850 and (b) a sixth capacitive divider switching device 1848 electrically coupled between third internal node 1850 and capacitor node 1832. Fourth capacitor switching stage 1826 includes (a) a seventh capacitive divider switching device 1852 electrically coupled between reference node 126 and a fourth internal node 1856 and (b) an eighth capacitive divider switching device 1854 electrically coupled between fourth internal node 1856 and capacitor node 1832.

In certain embodiments, each of capacitive divider switching devices 1834, 1836, 1840, 1842, 1846, 1848, 1852, and 1854 includes one or more transistors, such as a FET, a BJT, and/or an IGBT. In some embodiments, each of capacitor switching stages 1820-1826 has a configuration similar to that illustrated in FIG. 8 or FIG. 9. First resonant capacitor 1828 is electrically coupled between first internal node 1838 and second internal node 1844, and second resonant capacitor 1830 is electrically coupled between third internal node 1850 and fourth internal node 1856.

Capacitive divider switching devices 1834, 1836, 1840, 1842, 1846, 1848, 1852, and 1854 are respectively controlled by control signals SC1, SC2, SC3, SC4, SC5, SC6, SC7, and SC8 generated by controller 1808, although connections between controller 1808 and the switching devices are not shown for illustrative clarity. Capacitive divider circuit 1802 forms the capacitive portion of a resonant tank circuit of resonant power converter 1800, and capacitive divider circuit 1802 has an effective capacitance value equal to the sum of the capacitance values of first and second resonant capacitors 1828 and 1830. Resonant power converter 1800 optionally further includes (a) an input capacitor (not shown) electrically coupled between input node 128 and reference node 126, and/or (b) an output capacitor (not shown) electrically coupled between output node 118 and reference node 126.

Figure 19:
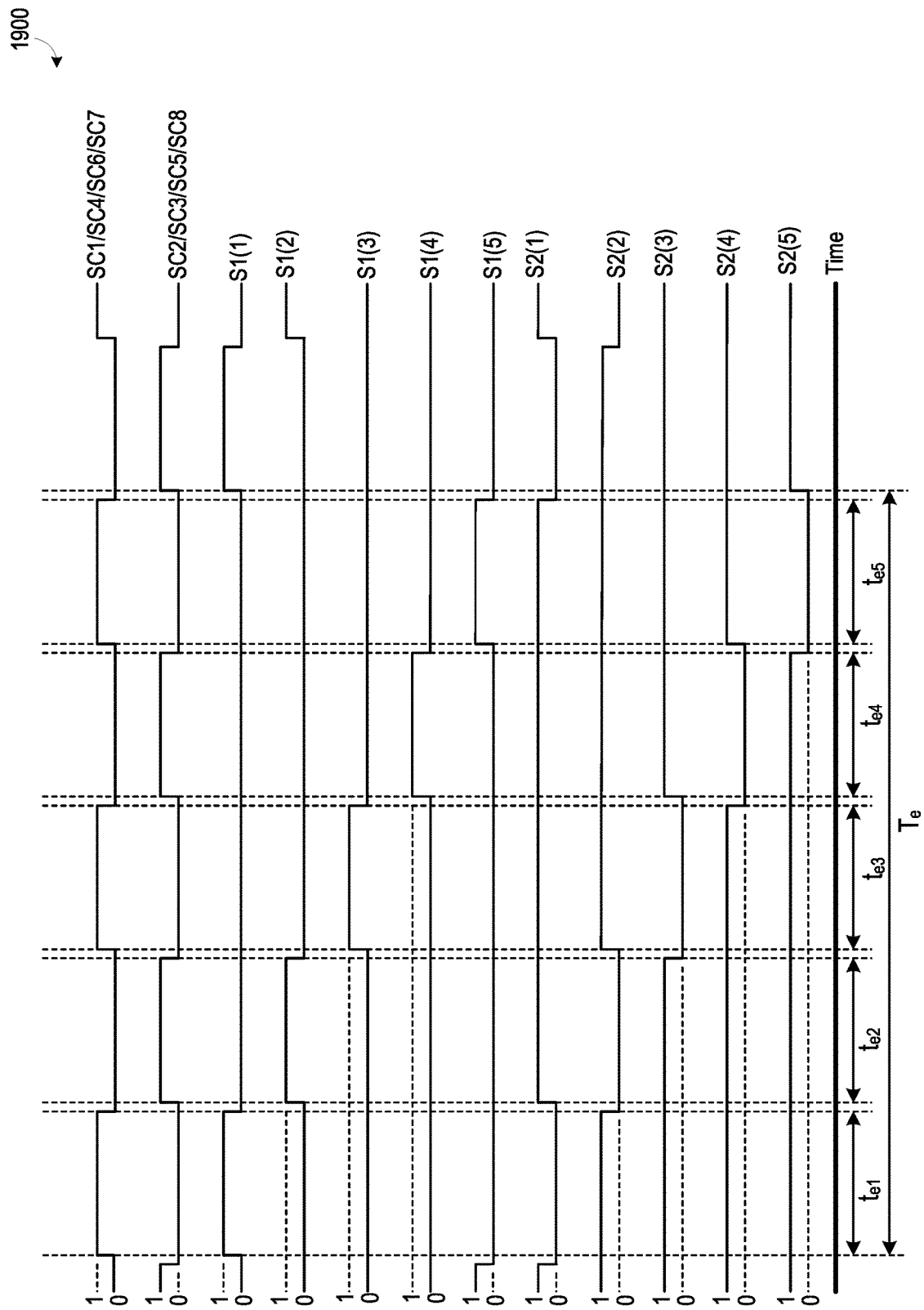
FIG. 19 is a graph illustrating one example of operation of the FIG. 18 resonant power converter.

Each switching stage 106 is electrically coupled between capacitor node 1832 and reference node 126, and each switching stage 106 is configured to repeatedly switch the first end 114 of its respective winding 110 between capacitor node 1832 and reference node 126, in response to control signals from controller 108. FIG. 19 is a graph 1900 illustrating one example of operation of resonant switching power converter 1800. Graph 1900 includes curves illustrating each control signal of resonant power converter 1800 as a function of time. Each control signal is illustrating in FIG. 19 as being asserted when in a logic high state and being de-asserted when in a logic low state, where the logic high state is represented by the number "1", and the logic low state is represented by the number "0". However, any of the control signals could have a different polarity without departing from the scope hereof.

As evident from FIG. 19, capacitive divider switching devices 1834, 1842, 1848, and 1852 switch in unison, and capacitive divider switching devices 1836, 1840, 1846, and 1854 switch in unison but out of phase with capacitive divider switching devices 1834, 1842, 1848, and 1852. Each switching stage 106 switches its respective winding end 114 between capacitor node 1832 and reference node 126 in response to control signals S1 and S2 generated by controller 1808. Each winding end 114 is driven high, i.e. to capacitor node 1832, once during each switching cycle $T_e$ of resonant power converter 1800, such that winding ends 114 are driven high of out phase with respect to each other. Specifically, first switching stage 106(1) electrically couples winding end 114(1) to capacitor node 1832 during a time period $t_{e1}$, second switching stage 106(2) electrically couples winding end 114(2) to capacitor node 1832 during a time period $t_{e2}$, third switching stage 106(3) electrically couples winding end 114(3) to capacitor node 1832 during a time period $t_{e3}$, fourth switching stage 106(4) electrically couples winding end 114(4) to capacitor node 1832 during a time period $t_{e4}$, and fifth switching stage 106(5) electrically couples winding end 114(5) to capacitor node 1832 during a time period $t_{e5}$.

Figure 20:
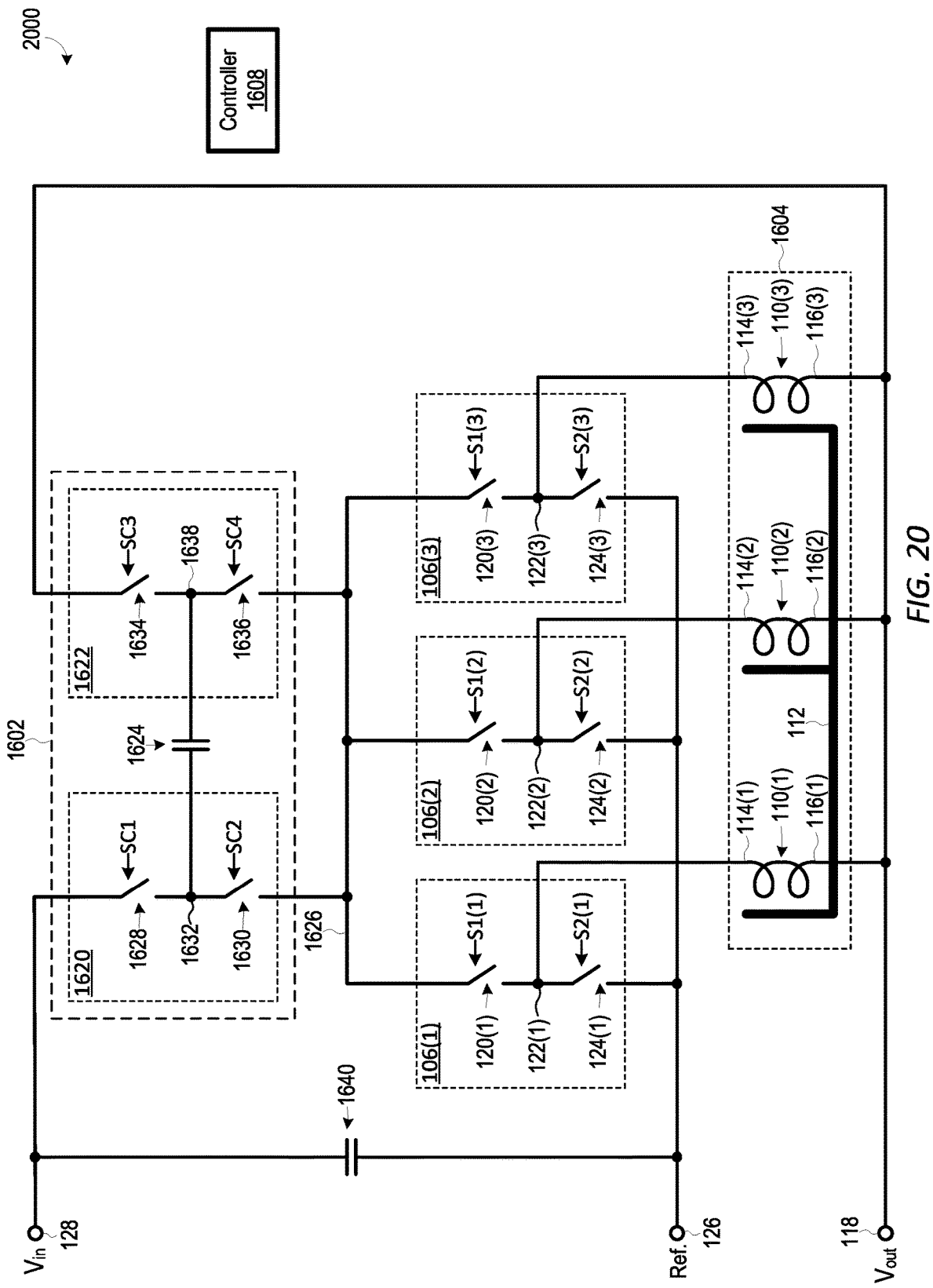
FIG. 20 is a schematic diagram of a resonant power converter including three switching stages which achieves a five to one voltage conversion ratio, according to an embodiment.

A ratio of input voltage to output voltage is an even ratio in resonant power converters 400, 700, 1100, 1400, 1600, and 1800, where an "even ratio" is a ratio where a quotient of the numerator divided by the denominator is an even number. However, resonant power converter 100 of FIG. 1 could also be configured to achieve a ratio of input voltage to output voltage that is an odd ratio, i.e., a ratio where a quotient of the numerator divided by the denominator is an odd number. For example, FIG. 20 is a schematic diagram of a resonant power converter 2000 which is an alternate embodiment of resonant power converter 1600 of FIG. 16, where third capacitive divider switching device 1634 is electrically coupled between output node 118 and second internal node 1638, instead of between reference node 126 and second internal node 1638. Resonant power converter 2000 may be operated in the same manner as resonant power converter 1600, such as illustrated in FIG. 17. Resonant power converter 2000 achieves a ratio of output voltage to input voltage of 2N−1 to one, or in other words, of five to one, where N is number of switching stages 106 and windings 110. Resonant power converter 1800 of FIG. 18, and extensions thereof, could be modified in like manner to achieve a ratio of output voltage to input voltage of 2N−1 to one.

Figure 21:
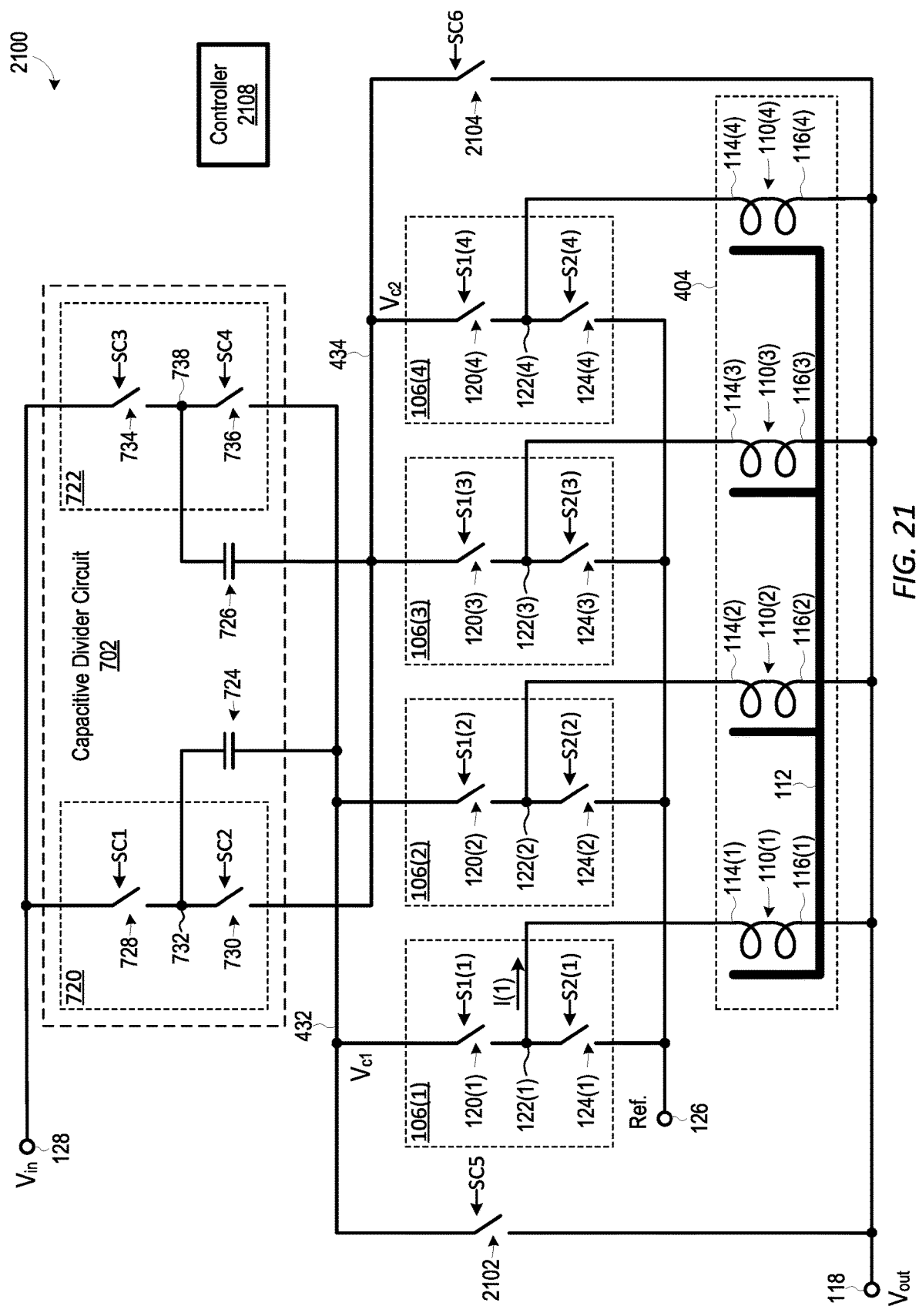
FIG. 21 is a schematic diagram of a resonant power converter including four switching stages which achieves a seven to one voltage conversion ratio, according to an embodiment.

FIG. 21 is a schematic diagram of a resonant power converter 2100, which is an alternate embodiment of resonant power converter 700 which achieves a ratio of input voltage to output voltage of 2N−1, or in other words, of seven to one, where N is number of switching stages 106 and associated windings 110. Resonant power converter 2100 differs from resonant power converter 700 in that (a) resonant power converter 2000 further includes switching devices 2102 and 2104 and (b) controller 708 is replaced with controller 2108. Switching device 2102 is electrically coupled between first capacitor node 432 and output node 118, and switching device 2102 is controlled by a control signal SC5. Switching device 2104 is electrically coupled between second capacitor node 434 and output node 118, and switching device 2104 is controlled by a control signal SC6. In some embodiments, each of switching devices 2102 and 2104 includes one or more transistors, such as a FET, a BJT, or an IGBT.

Figure 22:
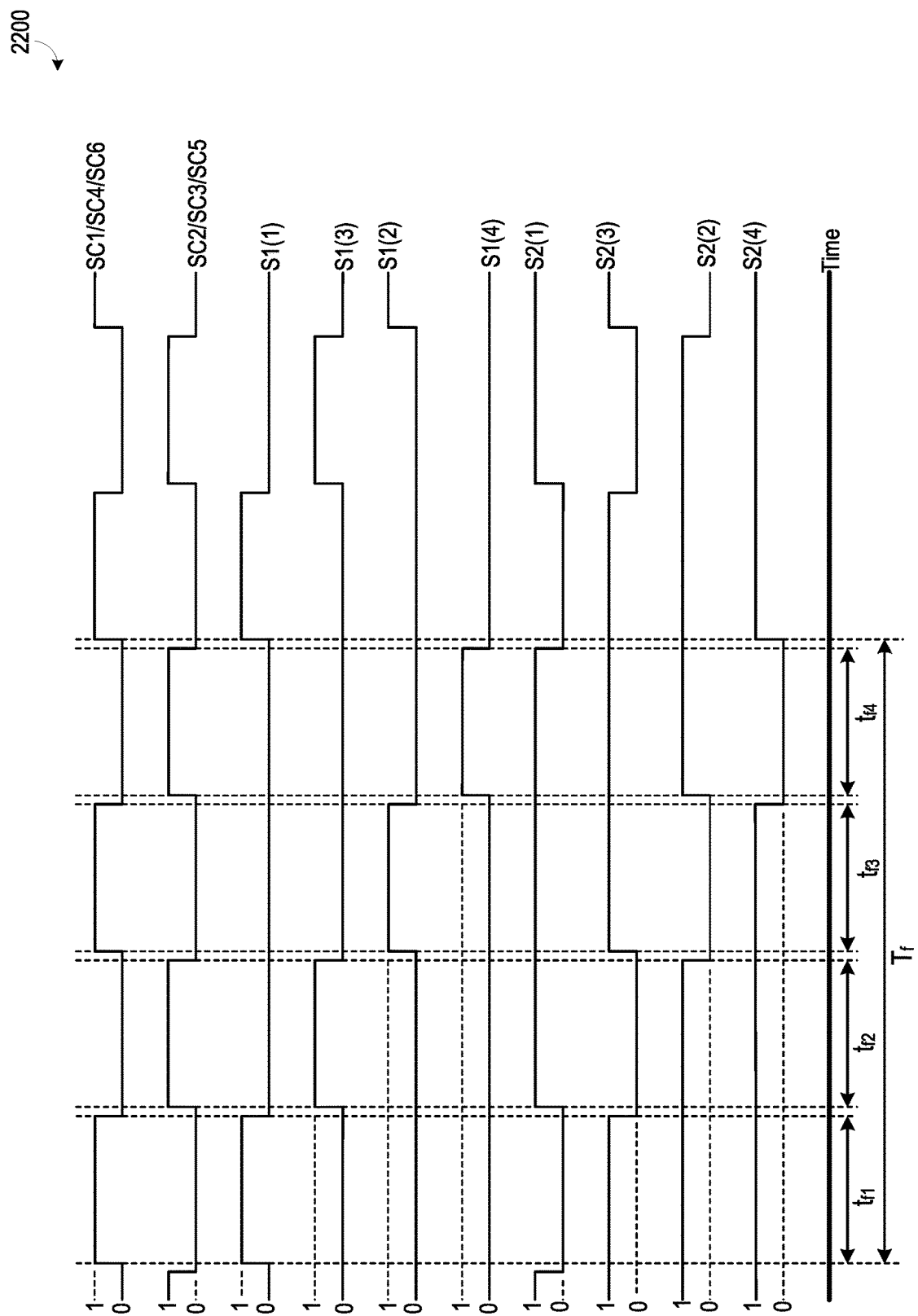
FIG. 22 is a graph illustrating one example of operation of the FIG. 21 resonant power converter.

Controller 2108 is configured to generate the control signals for resonant power converter 210. FIG. 22 is a graph 2200 illustrating one example of operation of resonant switching power converter 2100. Graph 2200 includes curves illustrating each control signal of resonant power converter 2100 as a function of time. Each control signal is illustrating in FIG. 22 as being asserted when in a logic high state and being de-asserted when in a logic low state, where the logic high state is represented by the number "1", and the logic low state is represented by the number "0". However, any of the control signals could have a different polarity without departing from the scope hereof.

As evident from FIG. 22, first capacitive divider switching device 728, fourth capacitive divider switching device 736, and switching device 2104 switch in unison. Additionally, second capacitive divider switching device 730, third capacitive divider switching device 734, and switching device 2102 switch in unison, but out of phase with switching devices 728, 736, and 2104. Each winding end 114 is driven high, i.e. to either first capacitor node 432 or second capacitor node 434, once during each switching cycle $T_f$ of resonant power converter 2100, such that winding ends 114 are alternately coupled to first and second capacitor nodes 432 and 434. Specifically, first switching stage 106(1) electrically couples winding end 114(1) to first capacitor node 432 during a time period $t_{f1}$, third switching stage 106(3) electrically couples winding end 114(3) to second capacitor node 434 during a time period $t_{f2}$, second switching stage 106(2) electrically couples winding end 114(2) to first capacitor node 432 during a time period $t_{f3}$, and fourth switching stage 106(4) electrically couples winding end 114(4) to second capacitor node 434 during a time period $t_{f4}$.

Any of the resonant power converters disclosed herein could be operated in a hard switching mode, instead of in resonant mode, during power converter start-up to achieve soft starting without requiring additional converter elements. A ratio of input voltage $V_{in}$ to output voltage $V_{out}$ is a function of switching device duty cycle during hard switching operation, and soft starting can therefore be achieved by (a) operating the resonant power converter at a significantly higher frequency than its resonant frequency, e.g. at twice its resonant frequency and (b) increasing switching device duty cycle from a minimum value (e.g., zero) to its resonant value during resonant power converter start-up. Upper switching device 120 duty cycle is controlled in resonant power converter 400 during soft starting, and duty cycle of capacitive divider switching devices 728, 730, 734, and 736 is controlled in resonant power converters 700, 1100, 1400, and 2100 during soft starting. Similarly, duty cycle of capacitive divider switching devices 1628, 1630, 1634, and 1636 is controlled in resonant power converters 1600 and 2000 during soft starting, and duty cycle of capacitive divider switching devices 1834, 1836, 1840, 1842, 1846, 1848, 1852, and 1856 is controlled in resonant power converter 1800 during soft starting. Additionally, voltage regulation could be achieved in a similar manner by operating a resonant power converter at a frequency significantly greater than its resonant frequency and by controlling switching device duty cycle to achieve a desired output voltage $V_{out}$. Upper switching device 720 duty cycle is controlled in resonant power converter 400 to achieve voltage regulation, and capacitive divider switching device 728, 730, 734, and 736 duty cycle is controlled in resonant power converters 700, 1100, 1400, and 2100 to achieve voltage regulation. Likewise, capacitive divider switching device duty cycle is controlled in resonant power converters 1600, 1800, and 2000 to achieve voltage regulation.

Figure 23:
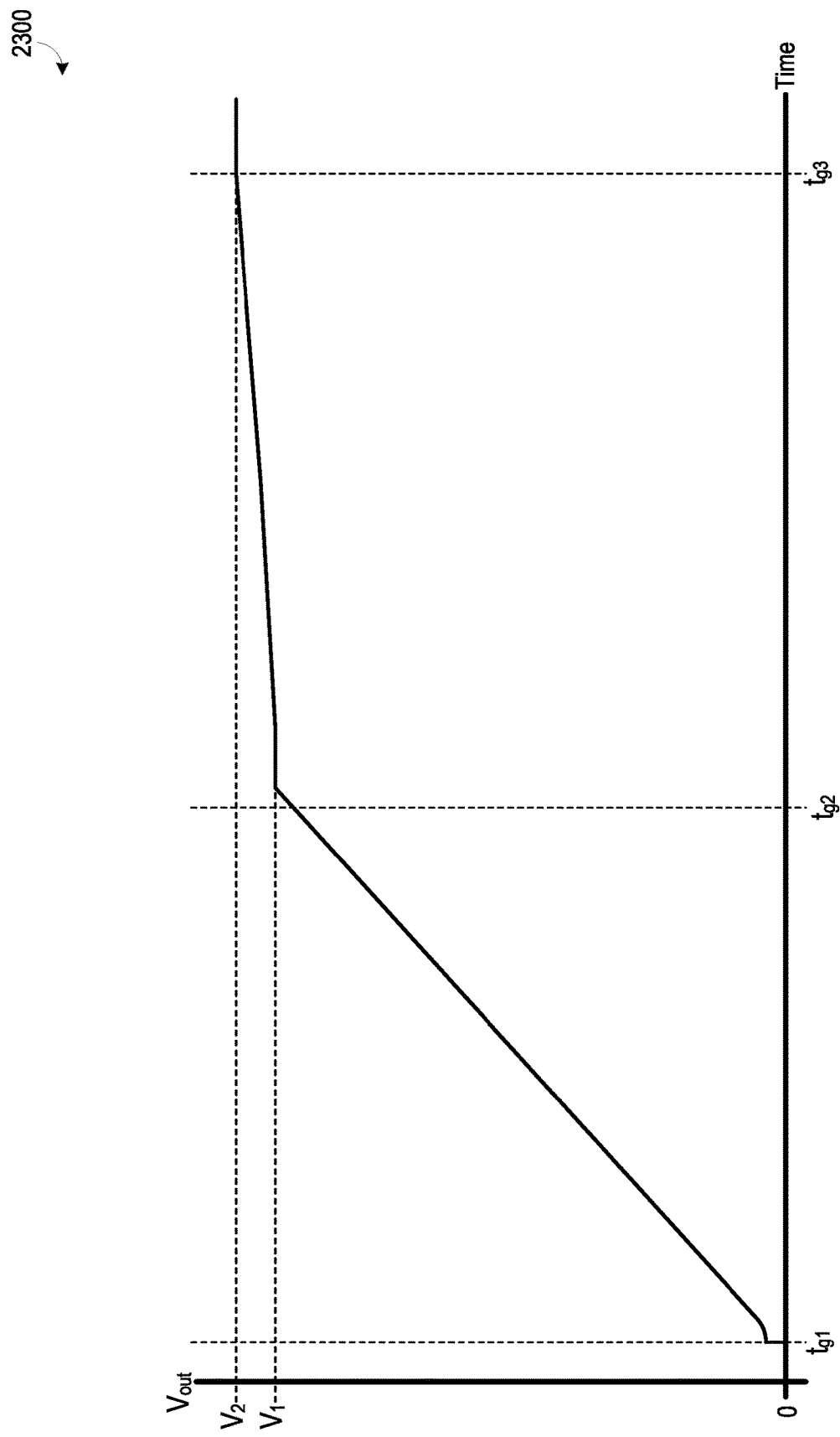
FIG. 23 is an example graph of output voltage as a function of time of an embodiment of the FIG. 7 resonant power converter which is configured for soft starting.

For example, FIG. 23 is an example graph 2300 of simulated output voltage $V_{out}$ as a function of time of an embodiment of resonant power converter 700 (FIG. 7) which is configured for soft starting. In this example, soft starting begins at time $t_{g1}$, and controller 708 is configured to operate resonant power converter 700 between times $t_{g1}$ and $t_{g2}$ at a frequency which is approximately twice the resonant frequency of resonant power converter 700. Additionally, controller 708 is configured to increase duty cycle of capacitive divider switching devices 728, 730, 734, and 736 from around zero to approximately 50 percent between time $t_{g1}$ and $t_{g2}$. Consequently, output voltage $V_{out}$ of resonant power converter 700 increases from zero to $V_1$ between times $t_{g1}$ and $t_{g2}$. Controller 708 subsequently reduces switching frequency of resonant power converter 700 from approximately twice resonant frequency at time $t_{g2}$ to resonant frequency at time $t_{g3}$, and output voltage increases from $V_1$ to $V_2$ between times $t_{g2}$ and $t_{g3}$. Soft starting is complete at time $t_{g3}$ where power converter 700 operates at resonant its frequency.

Figure 24:
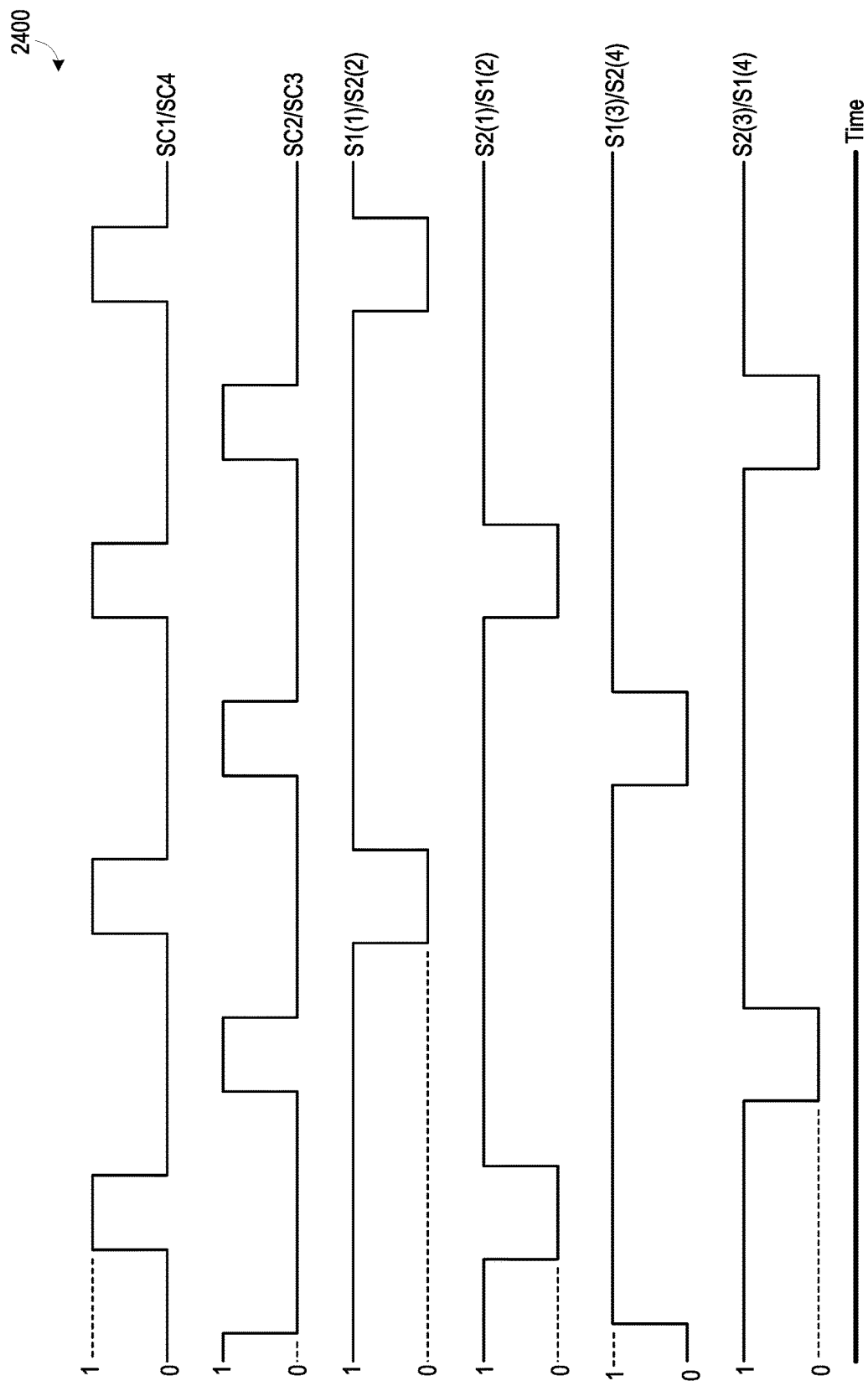
FIG. 24 is a graph illustrating one example of operation of the FIG. 7 resonant power converter during soft start operation as depicted in FIG. 23.

FIG. 24 is a graph 2400 illustrating one example of operation of resonant power converter 700 during an operating point between times $t_{g1}$ and $t_{g2}$ where duty cycle of capacitive divider switching devices 728, 730, 734, and 736 is approximately 25 percent. Graph 2400 includes the same curves as graph 1000 of FIG. 10. The relatively low duty cycle of capacitive divider switching devices 728, 730, 734, and 736 during the soft start operating point depicted in FIG. 24 can be appreciated by comparing graph 2400 to graph 1000 where the duty cycle is about 50 percent.

Figure 25:
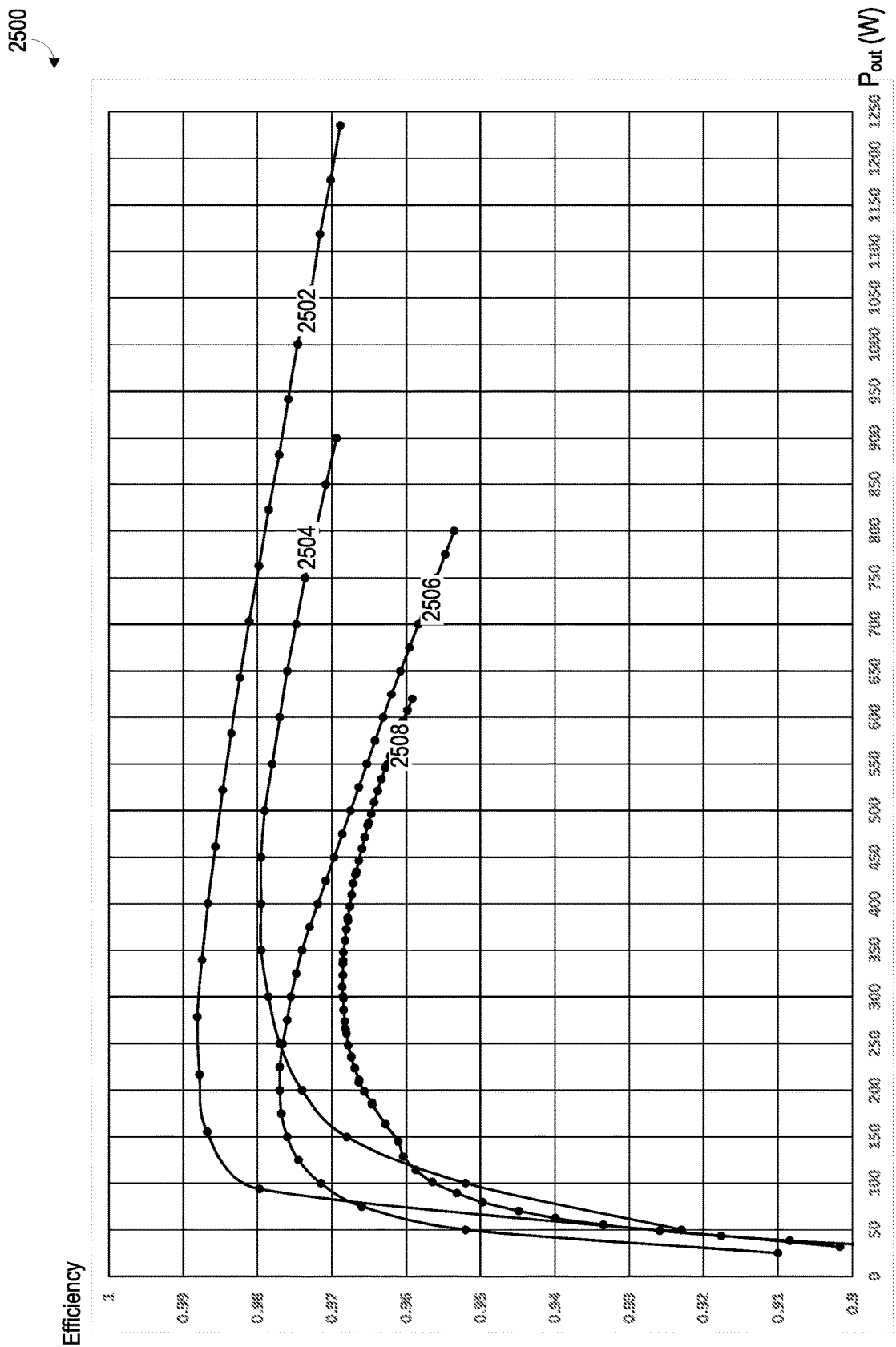
FIG. 25 is a graph of efficiency versus output power of several power converters.

As discussed above, certain embodiments of the new resonant power converters disclosed herein can achieve significantly higher efficiency than conventional resonant power converters. For example, FIG. 25 is a graph 2500 of simulated efficiency as a function of output power for several power converters. Graph 2500 includes curves 2502, 2504, 2506, and 2508. Curve 2502 corresponds to an embodiment of resonant power converter 100, i.e. a resonant power converter including a coupled inductor. Curve 2504 corresponds to a conventional LLC converter with Gallium Nitride semiconductor transistors, and curve 2506 corresponds to a conventional LLC converter with Silicon semiconductor transistors. Curve 2508 corresponds to a conventional buck converter. As evident from FIG. 25, the resonant power converter including a coupled inductor achieves significantly higher efficiency than the conventional power converters.

Figure 26:
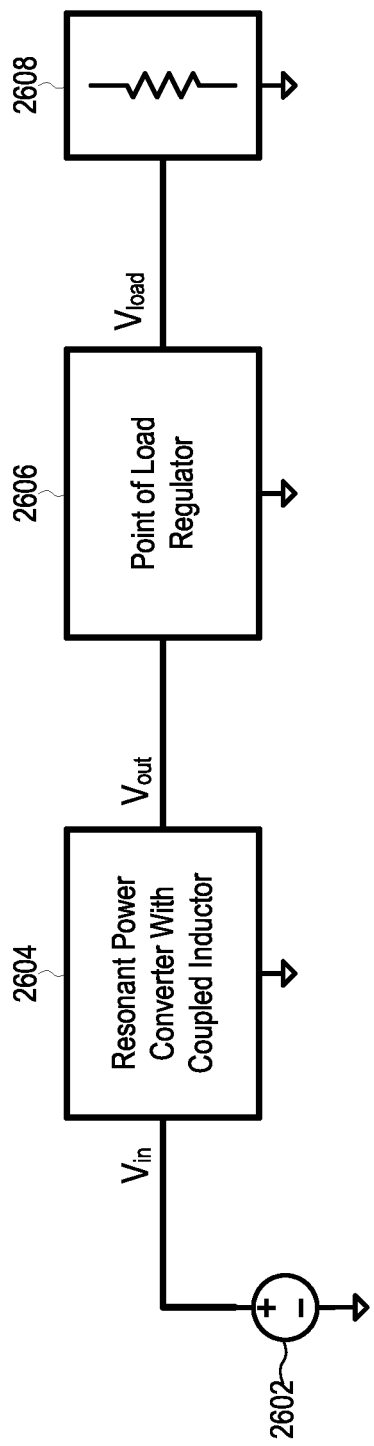
FIG. 26 is a block diagram of an electrical assembly including a resonant power converter with a coupled inductor, according to an embodiment.

One possible application of the new resonant power converters disclosed herein is to perform voltage conversion in an electrical assembly. For example, FIG. 26 is a block diagram of an electrical assembly 2600 including a voltage source 2602, a resonant power converter 2604, a point of load regulator 2606, and a load 2608. Voltage source 2602 generates a voltage $V_{in}$, and resonant power converter 2604 steps down voltage $V_{in}$ to voltage $V_{out}$. In some embodiments, $V_{in}$ is 48.0 volts, and $V_{out}$ is one of 12.0 volts, 8.0 volts, 9.6 volts, 6.9 volts, 6.0 volts, 4.8 volts, 4.0 volts, or 3.0 volts. Resonant power converter 2604 is any one of the new resonant power converters disclosed herein, e.g., resonant power converter 100, 400, 700, 1100, 1400, 1600, 1800, 2000, or 2100. Point of load regulator 2606 steps down voltage $V_{out}$ to voltage $V_{load}$ for load 2608. Load 2608 includes, for example, one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit. In some alternate embodiment, point of load regulator 2606 is omitted such that resonant power converter 2604 directly powers load 2608. Additionally, in some other embodiments, point load regulator 2606 is co-packaged with load 2608 and/or resonant power converter 2604.

Combinations of Features

Features described above may be combined in various ways without departing from the scope hereof. The following examples illustrate some possible combinations.

(A1) A resonant power converter includes (1) a capacitive divider circuit, (2) a coupled inductor including N windings, N being an integer greater than two, wherein total leakage inductance of the coupled inductor and an equivalent capacitance of the capacitance divider circuit collectively form a resonant tank circuit of the resonant power converter, and (3) N switching stages, each of the N switching stages being electrically coupled between a respective one of the N windings of the coupled inductor and the capacitive divider circuit.

(A2) In the resonant power converter denoted as (A1), the capacitive divider circuit may include (1) a first resonant capacitor and a second resonant capacitor and (2) a transformer including a first transformer winding and a second transformer winding, the first transformer winding being electrically coupled in parallel with the first resonant capacitor, and the second transformer winding being electrically coupled in parallel with the second resonant capacitor.

(A3) In the resonant power converter denoted as (A2), each of the first transformer winding and the first resonant capacitor may be electrically coupled between a first capacitor node and an input node, and each of the second transformer winding and the second resonant capacitor may be electrically coupled between the input node and a second capacitor node.

(A4) In the resonant power converter denoted as (A3), (1) a first switching stage of the N switching stages may be configured to switch a first end of a first winding of the N windings of the coupled inductor between the first capacitor node and a reference node, (2) a second switching stage of the N switching stages may be configured to switch a first end of a second winding of the N windings of the coupled inductor between the second capacitor node and the reference node, (3) a third switching stage of the N switching stages may be configured to switch a first end of a third winding of the N windings of the coupled inductor between the first capacitor node and the reference node, and (4) a fourth switching stage of the N switching stages may be configured to switch a first end of a fourth winding of the N windings of the coupled inductor between the second capacitor node and the reference node.

(A5) In the resonant power converter denoted as (A4), a respective second end of each of the first, second, third, and fourth windings may be electrically coupled to a common output node.

(A6) Any one of the resonant power converters denoted as (A4) and (A5) may further include a controller configured to generate control signals to control each of the first, second, third, and fourth switching stages such that each switching stage switches out of phase with respect to each other switching stage.

(A7) In the resonant power converter denoted as (A6), (1) the first switching stage may include an upper switching device and a lower switching device electrically coupled in series between the first capacitor node and the reference node, (2) the first end of the first winding may be electrically coupled to a switching node joining the upper and lower switching devices in the first switching stage, and (3) the controller may be further configured to generate control signals to control each of the first, second, third, and fourth switching stages such that (a) a voltage at the first capacitor node repeatedly transitions between a maximum value and a minimum value, (b) the upper switching device switches from its off state to its on state when the voltage at the first capacitor node is at the maximum value, and (c) the upper switching device switches from its on state to its off state when the voltage at the first capacitor node is at the minimum value.

(A8) In the resonant power converter denoted as (A1), the capacitive divider circuit may include (1) a first capacitor switching stage electrically coupled between an input node and a second capacitor node, (2) a second capacitor switching stage electrically coupled between the input node and a first capacitor node, (3) a first resonant capacitor electrically coupled between an internal node of the first capacitor switching stage and the first capacitor node, and (4) a second resonant capacitor electrically coupled between an internal node of the second capacitor switching stage and the second capacitor node.

(A9) In the resonant power converter denoted as (A8), (1) a first switching stage of the N switching stages may be configured to switch a first end of a first winding of the N windings of the coupled inductor between the first capacitor node and a reference node, (2) a second switching stage of the N switching stages may be configured to switch a first end of a second winding of the N windings of the coupled inductor between the first capacitor node and the reference node, (3) a third switching stage of the N switching stages may be configured to switch a first end of a third winding of the N windings of the coupled inductor between the second capacitor node and the reference node, and (4) a fourth switching stage of the N switching stages may be configured to switch a first end of a fourth winding of the N windings of the coupled inductor between the second capacitor node and the reference node.

(A10) In the resonant power converter denoted as (A9), a respective second end of each of the first, second, third, and fourth windings may be electrically coupled to a common output node.

(A11) Any one of the resonant power converters denoted as (A9) and (A10) may further include a controller configured to generate control signals to control each of the first, second, third, and fourth switching stages such that each switching stage switches out of phase with respect to each other switching stage.

(A12) In the resonant power converter denoted as (A11), the controller may be further configured to generate control signals to control each of the first, second, third, and fourth switching stages such that the second resonant capacitor is electrically coupled to the reference node when the first end of the first winding is electrically coupled to the first capacitor node.

(A13) In the resonant power converter denoted as (A1), the capacitive divider circuit may include (1) a first capacitor switching stage electrically coupled between an input node and a capacitor node, (2) a second capacitor switching stage electrically coupled between a reference node and the capacitor node, and (3) a first resonant capacitor electrically coupled between a first internal node of the first capacitor switching stage and a second internal node of the second capacitor switching stage.

(A14) In the resonant power converter denoted as (A13), the capacitive divider circuit may further include (1) a third capacitor switching stage electrically coupled between the input node and the capacitor node, (2) a fourth capacitor switching stage electrically coupled between the reference node and the capacitor node, and (3) a second resonant capacitor electrically coupled between a third internal node of the third capacitor switching stage and a fourth internal node of the fourth capacitor switching stage.

(B1) A resonant power converter includes (1) a first resonant capacitor and a second resonant capacitor electrically coupled in series between a first capacitor node and a second capacitor node, (2) a transformer including (a) a first transformer winding electrically coupled in parallel with the first resonant capacitor and (b) a second transformer winding electrically coupled in parallel with the second resonant capacitor, (3) a coupled inductor including at least first, second, third, and fourth windings, (4) a first upper switching device electrically coupled between the first capacitor node and a first end of the first winding, (5) a second upper switching device electrically coupled between the second capacitor node and a first end of the second winding, (6) a second lower switching device electrically coupled between the first end of the second winding and the reference node, (7) a third upper switching device electrically coupled between the first capacitor node and a first end of the third winding, (8) a third lower switching device electrically coupled between the first end of the third winding and the reference node, (9) a fourth upper switching device electrically coupled between the second capacitor node and a first end of the fourth winding, and (10) a fourth lower switching device electrically coupled between the first end of the fourth winding and the reference node.

(B2) The resonant power converter denoted as (B1) may further include a controller configured to generate control signals to control each of the first, second, third, and fourth upper switching device such that each upper switching device switches out of phase with respect to each other upper switching device.

(B3) In the resonant power converter denoted as (B2), the controller may be further configured to generate control signals to control each of the upper switching devices and each of the lower switching devices such that (1) a voltage at the first capacitor node repeatedly transitions between a first maximum value and a first minimum value, (2) the first upper switching device switches from its off state to its on state when the voltage at the first capacitor node is at the first maximum value, and (3) the first upper switching device switches from its on state to its off state when the voltage at the first capacitor node is at the first minimum value.

(B4) In the resonant power converter denoted as (B3), the controller may be further configured to generate control signals to control each of the upper switching devices and each of the lower switching devices such that (1) a voltage at the second capacitor node repeatedly transitions between a second maximum value and a second minimum value, (2) the second upper switching device switches from its off state to its on state when the voltage at the second capacitor node is at the second maximum value, and (3) the second upper switching device switches from its on state to its off state when the voltage at the second capacitor node is at the second minimum value.

(B5) In any one of the resonant power converters denoted as (B1) through (B4), (1) a respective second end of each of the first, second, third, and fourth windings may be electrically coupled to a common output node, (2) the first resonant capacitor may be electrically coupled between the first capacitor node and an input node, and (3) the second resonant capacitor may be electrically coupled between the input node and the second capacitor node.

(B6) In any one of the resonant power converters denoted as (B1) through (B5), each of the upper switching devices and each of the lower switching devices may include a respective transistor.

(B7) In any one of the resonant power converters denoted as (B1) through (B6), a ratio of magnetizing inductance of the coupled inductor to leakage inductance of the coupled inductor may be at least twenty, the leakage inductance of the coupled inductor being a sum of respective leakage inductance values of all windings of the coupled inductor.

(C1) A resonant power converter includes (1) a first capacitive divider switching device electrically coupled between an input node and a first internal node, (2) a second capacitive divider switching device electrically coupled between the first internal node and a second capacitor node, (3) a third capacitive divider switching device electrically coupled between the input node and a second internal node, (4) a fourth capacitive divider switching device electrically coupled between the second internal node and a first capacitor node, (5) a first resonant capacitor electrically coupled between the first internal node and the first capacitor node, (6) a second resonant capacitor electrically coupled between the second internal node and the second capacitor node, (7) a coupled inductor including at least first, second, third, and fourth windings, (8) a first upper switching device electrically coupled between the first capacitor node and a first end of the first winding, (9) a first lower switching device electrically coupled between the first end of the first winding and a reference node, (10) a second upper switching device electrically coupled between the first capacitor node and a first end of the second winding, (11) a second lower switching device electrically coupled between the first end of the second winding and the reference node, (12) a third upper switching device electrically coupled between the second capacitor node and a first end of the third winding, (13) a third lower switching device electrically coupled between the first end of the third winding and the reference node, (14) a fourth upper switching device electrically coupled between the second capacitor node and a first end of the fourth winding, and (15) a fourth lower switching device electrically coupled between the first end of the fourth winding and the reference node.

(C2) The resonant power converter denoted as (C1) may further include a controller configured to generate control signals to control each of the first, second, third, and fourth capacitive divider switching devices such that (1) the first and fourth capacitive divider switching devices switch in unison, (2) the second and third capacitive divider switching devices switch in unison, (3) the first and fourth capacitive divider switching devices switch out of phase with respect to the second and third capacitive divider switching devices.

(C3) In the resonant power converter denoted as (C2), the controller may be further configured to generate control signals to control each of the upper switching devices and each of the lower switching devices such that the second resonant capacitor is electrically coupled between the second internal node and the reference node when (1) the first upper switching device is in its on-state and (2) the first lower switching device is in its off-state (C4) In any one of the resonant power converters denoted as (C1) through (C3), a respective second end of each of the first, second, third, and fourth windings may be electrically coupled to a common output node.

(C5) In any one of the resonant power converters denoted as (C1) through (C4), each of the lower switching devices, and each of the capacitive divider switching devices may include a respective transistor.

(C6) In any one of the resonant power converters denoted as (C1) through (C5), a ratio of magnetizing inductance of the coupled inductor to leakage inductance of the coupled inductor may be at least twenty, the leakage inductance of the coupled inductor being a sum of respective leakage inductance values of all windings of the coupled inductor.

(D1) A method for operating a resonant power converter includes (1) establishing a resonant frequency of the resonant power converter using a resonant tank circuit collectively formed by (a) capacitance of a capacitive divider circuit of the resonant power converter and (b) total leakage inductance of a coupled inductor of the resonant power converter, and (2) causing at least two switching stages to switch out of phase with respect to each other, each of the at least two switching stages being electrically coupled between a respective winding of the coupled inductor and the capacitive divider circuit.

(D2) The method denoted as (D1) may further include (1) causing an upper switching device of a first switching stage of the at least two switching stages to switch from its off-state to its on-state when a voltage of a first capacitor node is at a maximum value, the first capacitor node joining the capacitive divider circuit and the upper switching device, and (2) causing the upper switching device of the first switching stage to switch from its on-state to its off state when a voltage of the first capacitor node is at a minimum value.

(D3) The method denoted as (D1) may further include controlling the at least two switching stages and the capacitive divider circuit such that a first capacitor of the capacitive divider circuit is electrically coupled between an input node and a first winding of the coupled inductor when a second capacitor of the capacitive divider circuit is electrically coupled between the first winding of the coupled inductor and a reference node.

(D4) The method denoted as (D1) may further include controlling the capacitive divider circuit such that (1) a capacitor of the capacitive divider circuit is electrically coupled between an input node and a capacitor node during a first time period, the at least two switching stages being electrically coupled to the capacitive divider circuit via the capacitor node, and (2) the capacitor of the capacitive divider circuit is electrically coupled between the capacitor node and one of a reference node and an output node during a second time period that is after the first time period.

(D5) Any one of the methods denoted as (D1) through (D4) may further include operating the resonant power converter in a hard switching mode during start-up of the resonant power converter, to achieve soft starting of the resonant power converter.

(D6) The method denoted as (D5) may further include operating the resonant power converter at a different frequency than the resonant frequency in the hard switching mode.

Changes may be made in the above resonant power converters and associated systems methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:
1. A resonant power converter, comprising:
  a capacitive divider circuit, the capacitive divider circuit including:
    a first capacitor switching stage electrically coupled between an input node and a second capacitor node,
    a second capacitor switching stage electrically coupled between the input node and a first capacitor node,
    a first resonant capacitor electrically coupled between an internal node of the first capacitor switching stage and the first capacitor node, and
    a second resonant capacitor electrically coupled between an internal node of the second capacitor switching stage and the second capacitor node;
  a coupled inductor including N windings, N being an integer greater than two, wherein total leakage inductance of the coupled inductor and an equivalent capacitance of the capacitive divider circuit collectively form a resonant tank circuit of the resonant power converter; and
  N switching stages, each of the N switching stages being electrically coupled between a respective one of the N windings of the coupled inductor and the capacitive divider circuit;
  wherein:
    a first switching stage of the N switching stages is configured to switch a first end of a first winding of the N windings of the coupled inductor between the first capacitor node and a reference node,
    a second switching stage of the N switching stages is configured to switch a first end of a second winding of the N windings of the coupled inductor between the first capacitor node and the reference node,
    a third switching stage of the N switching stages is configured to switch a first end of a third winding of the N windings of the coupled inductor between the second capacitor node and the reference node,
    a fourth switching stage of the N switching stages is configured to switch a first end of a fourth winding of the N windings of the coupled inductor between the second capacitor node and the reference node, and
    a respective second end of each of the first, second, third, and fourth windings is electrically coupled to a common output node.
2. A resonant power converter, comprising:
  a capacitive divider circuit, the capacitive divider circuit including:
    a first capacitor switching stage electrically coupled between an input node and a second capacitor node,
    a second capacitor switching stage electrically coupled between the input node and a first capacitor node,
    a first resonant capacitor electrically coupled between an internal node of the first capacitor switching stage and the first capacitor node, and a second resonant capacitor electrically coupled between an internal node of the second capacitor switching stage and the second capacitor node;

a coupled inductor including N windings, N being an integer greater than two, wherein total leakage inductance of the coupled inductor and an equivalent capacitance of the capacitive divider circuit collectively form a resonant tank circuit of the resonant power converter;

N switching stages, each of the N switching stages being electrically coupled between a respective one of the N windings of the coupled inductor and the capacitive divider circuit, wherein:
 a first switching stage of the N switching stages is configured to switch a first end of a first winding of the N windings of the coupled inductor between the first capacitor node and a reference node,
 a second switching stage of the N switching stages is configured to switch a first end of a second winding of the N windings of the coupled inductor between the first capacitor node and the reference node,
 a third switching stage of the N switching stages is configured to switch a first end of a third winding of the N windings of the coupled inductor between the second capacitor node and the reference node, and
 a fourth switching stage of the N switching stages is configured to switch a first end of a fourth winding of the N windings of the coupled inductor between the second capacitor node and the reference node; and a controller configured to generate control signals to control each of the first, second, third, and fourth switching stages such that each of the first, second, third, and fourth switching stages switches out of phase with respect to each other of the first, second, third, and fourth switching stages.

3. The resonant power converter of claim 2, wherein the controller is further configured to generate the control signals to control each of the first, second, third, and fourth switching stages such that the second resonant capacitor is electrically coupled to the reference node when the first end of the first winding is electrically coupled to the first capacitor node.

4. A method for operating a resonant power converter, comprising:
 establishing a resonant frequency of the resonant power converter using a resonant tank circuit collectively formed by (a) capacitance of a capacitive divider circuit of the resonant power converter and (b) total leakage inductance of a coupled inductor of the resonant power converter, the capacitive divider circuit including:
  a first capacitor switching stage electrically coupled between an input node and a second capacitor node,
  a second capacitor switching stage electrically coupled between the input node and a first capacitor node,
  a first resonant capacitor electrically coupled between an internal node of the first capacitor switching stage and the first capacitor node, and
  a second resonant capacitor electrically coupled between an internal node of the second capacitor switching stage and the second capacitor node; and
 using a controller, causing each of a first switching stage, a second switching stage, a third switching stage, and fourth switching stage to switch out of phase with respect to each other of the first switching stage, the second switching stage, the third switching stage, and the fourth switching stage, wherein:
  the first switching stage is configured to switch a first end of a first winding of the coupled inductor between the first capacitor node and a reference node,
  the second switching stage is configured to switch a first end of a second winding of the coupled inductor between the first capacitor node and the reference node,
  the third switching stage is configured to switch a first end of a third winding of the coupled inductor between the second capacitor node and the reference node, and
  the fourth switching stage is configured to switch a first end of a fourth winding of the coupled inductor between the second capacitor node and the reference node.

5. The method of claim 4, further comprising:
 using the controller, causing an upper switching device of the first switching stage to switch from an off-state to an on-state when a voltage of the first capacitor node is at a maximum value; and
 using the controller, causing the upper switching device of the first switching stage to switch from the on-state to the off state when the voltage of the first capacitor node is at a minimum value.

6. The method of claim 4, further comprising controlling at least the first switching stage, the second switching stage, the third switching stage, the fourth switching stage, and the capacitive divider circuit such that the first resonant capacitor is electrically coupled between the input node and the first winding of the coupled inductor when the second resonant capacitor is electrically coupled between the first winding of the coupled inductor and the reference node.

7. The method of claim 4, further comprising operating the resonant power converter in a hard switching mode during start-up of the resonant power converter, to achieve soft starting of the resonant power converter.

8. The method of claim 7, further comprising operating the resonant power converter at a different frequency than the resonant frequency in the hard switching mode.

* * * * *